US011981772B2

United States Patent
Suemitsu et al.

(10) Patent No.: US 11,981,772 B2
(45) Date of Patent: May 14, 2024

(54) POLYOXYMETHYLENE AND METHOD OF PRODUCING SAME

(71) Applicant: ASAHI KASEI KABUSHIKI KAISHA, Tokyo (JP)

(72) Inventors: Chihiro Suemitsu, Tokyo (JP); Hitoshi Mizomoto, Tokyo (JP); Kenji Ebara, Tokyo (JP); Tatsuya Suzuki, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 638 days.

(21) Appl. No.: 17/275,755

(22) PCT Filed: Sep. 10, 2019

(86) PCT No.: PCT/JP2019/035577
§ 371 (c)(1),
(2) Date: Mar. 12, 2021

(87) PCT Pub. No.: WO2020/054730
PCT Pub. Date: Mar. 19, 2020

(65) Prior Publication Data
US 2022/0033558 A1 Feb. 3, 2022

(30) Foreign Application Priority Data

| Sep. 14, 2018 | (JP) | 2018-172900 |
| Sep. 14, 2018 | (JP) | 2018-172993 |
| Sep. 14, 2018 | (JP) | 2018-172995 |
| Sep. 14, 2018 | (JP) | 2018-172997 |
| Feb. 7, 2019 | (JP) | 2019-020347 |
| Jun. 27, 2019 | (JP) | 2019-120383 |
| Jul. 12, 2019 | (JP) | 2019-129907 |

(51) Int. Cl.
C08G 2/04 (2006.01)
C08G 2/06 (2006.01)
C08G 2/10 (2006.01)
C08G 2/18 (2006.01)

(52) U.S. Cl.
CPC .......... *C08G 2/10* (2013.01); *C08G 2/04* (2013.01); *C08G 2/06* (2013.01); *C08G 2/18* (2013.01); *C08G 2650/22* (2013.01); *C08G 2650/38* (2013.01)

(58) Field of Classification Search
USPC ........................................................ 528/232
See application file for complete search history.

(56) References Cited

U.S. PATENT DOCUMENTS

| 4,622,385 A | 11/1986 | Asano et al. |
| 6,506,850 B1 | 1/2003 | Tanimura et al. |
| 2005/0148755 A1 | 7/2005 | Goertz et al. |
| 2008/0167439 A1 | 7/2008 | Assmann et al. |
| 2009/0270587 A1 | 10/2009 | Haubs et al. |
| 2011/0077378 A1 | 3/2011 | Haubs et al. |
| 2013/0082064 A1 | 4/2013 | Larson et al. |
| 2014/0182485 A1 | 7/2014 | Hebel et al. |
| 2015/0111796 A1 | 4/2015 | Zia et al. |
| 2015/0112018 A1 | 4/2015 | Nakaya et al. |
| 2017/0088787 A1 | 3/2017 | Zia et al. |
| 2017/0349742 A1 | 12/2017 | Horiguchi et al. |
| 2018/0265617 A1 | 9/2018 | Nakaya et al. |
| 2022/0033558 A1 | 2/2022 | Suemitsu et al. |

FOREIGN PATENT DOCUMENTS

| CN | 101068840 A | 11/2007 | |
| CN | 102037036 A | 4/2011 | |
| CN | 102079801 A | 6/2011 | |
| CN | 103946255 A | 7/2014 | |
| CN | 107108825 A | 8/2017 | |
| EP | 0088541 A2 | 9/1983 | |
| EP | 0137305 A2 | 4/1985 | |
| EP | 0504405 | * 9/1992 | |
| EP | 2301978 A1 | 3/2011 | |
| EP | 3239201 A1 | 11/2017 | |
| JP | S4317199 B | 7/1968 | |
| JP | S48003913 A | 1/1973 | |
| JP | S5730715 A | 2/1982 | |
| JP | S58152012 A | 9/1983 | |
| JP | S6060121 A | 4/1985 | |
| JP | S6063216 A | 4/1985 | |
| JP | H0229427 A | 1/1990 | |
| JP | 2000143748 A | 5/2000 | |
| JP | 2001011196 A | 1/2001 | |
| JP | 2001131252 A | 5/2001 | |
| JP | 2008521950 A | 6/2008 | |
| JP | 2011068855 A | * 4/2011 | ............... C08G 2/06 |
| JP | 2011068855 A | 4/2011 | |

(Continued)

OTHER PUBLICATIONS

JP 2011068855A Machine Translation (Year: 2011).*
JP 2017160332 Machine Translation (Year: 2017).*
Xu Jian et al., Fundamentals of High Performance Fibers, Jul. 2018, pp. 25-26.
Oct. 22, 2021, the Supplementary European Search Report issued by the European Patent Office in the corresponding European Patent Application No. 19860370.6.
Masaki Hasegawa et al., Formation of Macrocyclic Poly(oxymethylene) with Narrow Molecular Weight Distribution on the Lamellar Crystals, Macromolecules, 1990, pp. 2629-2636, vol. 23, No. 10.
Aug. 12, 2022, European Search Report issued by the European Patent Office in the corresponding European Patent Application No. 22170741.7.

(Continued)

*Primary Examiner* — Terressa Boykin
(74) *Attorney, Agent, or Firm* — KENJA IP LAW PC

(57) ABSTRACT

Polyoxymethylene, where a ratio of a low molecular weight component having a molecular weight of 10,000 or less in a molecular weight distribution is 7.0% or less of the total, and the molecular weight distribution is obtained by measurement by gel permeation chromatography (GPC) using polymethyl methacrylate (PMMA) as a standard substance.

16 Claims, 2 Drawing Sheets

(56) References Cited

FOREIGN PATENT DOCUMENTS

| | | | |
|---|---|---|---|
| JP | 2011516705 A | | 5/2011 |
| JP | 5709060 B2 | | 4/2015 |
| JP | 2016534171 A | | 11/2016 |
| JP | 2017160332 A | | 9/2017 |
| JP | 2017160332 A | * | 9/2017 |
| JP | 2018532848 A | | 11/2018 |
| JP | 2022022429 A | | 2/2022 |
| JP | 2022022430 A | | 2/2022 |
| WO | 0017247 A1 | | 3/2000 |
| WO | 2013172270 A1 | | 11/2013 |
| WO | 2016125358 A1 | | 8/2016 |
| WO | 2018134075 A1 | | 7/2018 |

OTHER PUBLICATIONS

Mar. 9, 2021, International Preliminary Report on Patentability issued in the International Patent Application No. PCT/JP2019/035577.

Nov. 19, 2019, International Search Report issued in the International Patent Application No. PCT/JP2019/035577.

* cited by examiner

POLYOXYMETHYLENE AND METHOD OF PRODUCING SAME

TECHNICAL FIELD

This disclosure relates to polyoxymethylene and a method of producing the same.

BACKGROUND

Polyoxymethylene is an engineering plastic having excellent mechanical strength and dimensional stability, which is mainly used for mechanical parts such as gears that require sliding ability. Some grades of polyoxymethylene are developed to contain reinforcing materials such as glass fiber to further increase the strength and creeping ability, and these grades are being widely used.

Polyoxymethylene can be obtained by cationic polymerization of formaldehyde or cyclic ethers such as 1,3,5-trioxane, or by anionic polymerization of formaldehyde.

Thermally stable polyoxymethylene can be synthesized by subjecting a monomer (preferably 1,3,5-trioxane) that forms a formaldehyde unit to cationic copolymerization with a small amount of comonomer to incorporate a small amount of oxyalkylene units into a chain substantially randomly. The adjustment of molecular weight is achieved by chain transfer agents, generally dialkylformals. By decomposing unstable terminals to initial oxyalkylene units in an alkaline medium (hydrolysis), it is possible to obtain a copolymer having a stable terminal hydroxyalkyl group (derived from a comonomer) and a terminal alkyl group (derived from a chain transfer agent). Generally, a heteropolyacid such as perfluoroalkanesulfonic acid (derivative) or phosphotungstic acid, or a boron trifluoride alkyl ether complex is used as an initiator, and a monomer having a low content of water and formic acid is used. A basic reagent is added to deactivate the polymerization mixture.

A polymer produced under the above polymerization conditions solidifies in the initial stage of the polymerization and has various molecular weight distributions depending on the conditions. Typically, a maximum on the curve of the molecular weight distribution is in a relatively low molecular weight region (for example, 2,000 daltons to 5,000 daltons), and a further maximum on the curve of the molecular weight distribution is in a relatively high molecular weight region (for example, 50,000 daltons to 200,000 daltons). The ratio of a low molecular weight component to the total molecular weight distribution is 5% to 20%, and the low molecular weight component can be determined by gel permeation chromatography (GPC). The content of the low molecular weight component has a great influence on the mechanical properties of the polymer. Further, it is known that low molecular weight components are cyclic bodies.

It is known that, by having a molecular weight distribution in a single-peaked shape with a low molecular weight component content of less than 3 weight % (polyoxymethylene having a number average molecular weight Mn of less than 8,000 daltons), it is possible to obtain polyoxymethylene with improved impact strength and flexural modulus by cationic polymerization of 1,3,5-trioxane (PTL 1). In addition, polyoxymethylene having a molecular weight distribution in a double-peaked shape in which a low molecular weight component content (here, it refers to polyoxymethylene having a number average molecular weight Mn of less than 10,000 daltons) are defined to 1 mass % to 5 mass % has also been proposed (PTL 2). Further, because a chain transfer reaction proceeds and the molecular weight decreases during polymerization, polyoxymethylene having a weight average molecular weight (Mw) of about 600,000 has been obtained in the prior art (PTL 3).

CITATION LIST

Patent Literature

PTL 1: JP 2011-68855 A
PTL 2: JP 5709060 B
PTL 3: JP 2017-160332 A

SUMMARY

Technical Problem

However, when a heteropolyacid is used as an initiator as described in PTL 1, the strong acidity promotes the polymer decomposition caused by heat, which impairs the thermal stability. Further, since the polyoxymethylene described in PTL 2 also uses a strong protonic acid as an initiator, it can be inferred that the thermal stability is impaired as in the above-mentioned case where a heteropolyacid is used as an initiator. With respect to the polyoxymethylene obtained in the prior art as described in PTL 3, the strength of the polymer itself is insufficient, and further improvement is being required.

The shape of the molecular weight distribution, which is single-peaked or double-peaked, is determined by the separative power of a molecular weight measuring apparatus or column and the positional relationship between the peak on a high molecular weight side and the peak on a low molecular weight side, and the shape does not essentially correlate with the physical properties. It is the average molecular weight and the molecular weight and content of the low molecular weight component that affect the physical properties.

It could thus be helpful to provide polyoxymethylene having high impact resistance and excellent thermal stability. Additionally, it could be helpful to provide polyoxymethylene with dramatically improved mechanical strength. Further, it could be helpful to provide a method of producing said polyoxymethylene.

Solution to Problem

As a result of diligent studies for solving the above-mentioned problem, we have found that the problem could be solved by polyoxymethylene whose low molecular weight component content is set in a specific range.

We thus provide the following.

(1) Polyoxymethylene, wherein a ratio of a low molecular weight component having a molecular weight of 10,000 or less in a molecular weight distribution is 7.0% or less of the total, and the molecular weight distribution is obtained by measurement by gel permeation chromatography (GPC) using polymethyl methacrylate (PMMA) as a standard substance.

Specifically, a first aspect of the present disclosure provides the following polyoxymethylene.

(2) The polyoxymethylene according to (1), comprising 0.50 mass ppm or more and less than 100 mass ppm of boron atoms.

(3) The polyoxymethylene according to (2), wherein a molecular weight distribution curve obtained by the measurement has a single-peaked shape and has a peak having a peak top at a logarithmic value of molecular weight log M=4.5 to 7.0, where M is the molecular weight.

Further, a second aspect of the present disclosure provides the following polyoxymethylene.

(4) The polyoxymethylene according to (1), wherein a weight average molecular weight (Mw) measured by the measurement is 750,000 or more, and the polyoxymethylene comprises 0.5 mass ppm or more of boron atoms, 0.1 mass ppm or more of tungsten atoms, 0.1 mass ppm or more of molybdenum atoms, 5 ppm or more of vanadium atoms, 5 mass ppm or more of fluorine atoms, 0.5 ppm or more of chlorine atoms, or 0.5 ppm or more of sulfur atoms.

(5) The polyoxymethylene according to (4), wherein the molecular weight distribution obtained by the measurement has one or more peaks in a range of logarithmic value of molecular weight log M=5.0 to 7.0 where M is the molecular weight, and a ratio of a low molecular weight component having a molecular weight of 10,000 or less is 0.1% to 7.0% of the total.

(6) A method of producing the polyoxymethylene according to (1), comprising subjecting a monomer forming a [—$CH_2$—O—] unit to cationic polymerization in the presence of an initiator, wherein the monomer is polymerized in a solid state.

(7) A method of producing the polyoxymethylene according to (1), comprising subjecting a monomer forming a [—$CH_2$—O—] unit to cationic polymerization in the presence of an initiator, wherein the initiator is used together with mesoporous silica having an average pore size of 1.0 nm to 5.5 nm.

(8) A method of producing the polyoxymethylene according to (2) or (4), comprising subjecting a monomer forming a [—$CH_2$—O—] unit to cationic polymerization in the presence of an initiator.

(9) The method of producing polyoxymethylene according to (8), wherein cyclic ether is used as the monomer.

(10) The method of producing polyoxymethylene according to (8) or (9), comprising performing polymerization at a temperature equal to or lower than a boiling point of the monomer and then performing heating at a temperature equal to or higher than a boiling point of the monomer.

(11) The method of producing polyoxymethylene according to (8) or (9), comprising melting the monomer and cooling the melted monomer to a temperature equal to or lower than a melting point of the monomer during a polymerization reaction.

(12) The method of producing polyoxymethylene according to (8) or (9), comprising subjecting a monomer forming a [—$CH_2$—O—] unit to cationic polymerization in the presence of an initiator and a Lewis base, wherein the Lewis base is a compound represented by the general formula (1):

general formula (1)

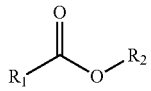

where each of $R_1$ and $R_2$ independently represents an alkyl group having 1 to 8 carbon atoms.

(13) The method of producing polyoxymethylene according to (8) or (9), comprising subjecting a monomer forming a [—$CH_2$—O—] unit to cationic polymerization in the presence of an initiator and a Lewis base, wherein the Lewis base is a compound represented by the general formula (2):

general formula (2)

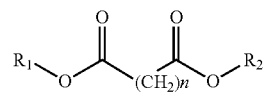

where n is an integer of 1 to 8, and each of $R_1$ and $R_2$ independently represents an alkyl group having 1 to 8 carbon atoms.

(14) The method of producing polyoxymethylene according to (8) or (9), comprising subjecting a monomer forming a [—$CH_2$—O—] unit to cationic polymerization in the presence of an initiator and a Lewis base, wherein the Lewis base is a compound represented by the general formula (3):

general formula (3)

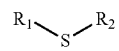

where each of $R_1$ and $R_2$ independently represents an alkyl group having 1 to 6 carbon atoms.

(15) The method of producing polyoxymethylene according to (8) or (9), comprising subjecting a monomer forming a [—$CH_2$—O—] unit to cationic polymerization in the presence of an initiator and a Lewis base, wherein the Lewis base is a compound represented by the general formula (4):

general formula (4)

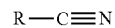

where R represents a hydrocarbon group having 1 to 13 carbon atoms.

(16) The method of producing polyoxymethylene according to (8) or (9), comprising subjecting a monomer forming a [—$CH_2$—O—] unit to cationic polymerization in the presence of an initiator and a Lewis base, wherein the Lewis base is a compound containing a trifluoromethyl group.

(17) The method of producing polyoxymethylene according to (8) or (9), comprising subjecting a monomer forming a [—$CH_2$—O—] unit to cationic polymerization in the presence of an initiator and a Lewis base, wherein the Lewis base is a cyclic compound containing a carbonyl group.

Advantageous Effect

The polyoxymethylene of the present disclosure has high impact resistance and excellent thermal stability. Additionally, according to the present disclosure, it is possible to provide polyoxymethylene with dramatically improved mechanical strength. Further, according to the present disclosure, it is possible to provide a production method with which said polyoxymethylene can be produced.

DETAILED DESCRIPTION

Figure 1:
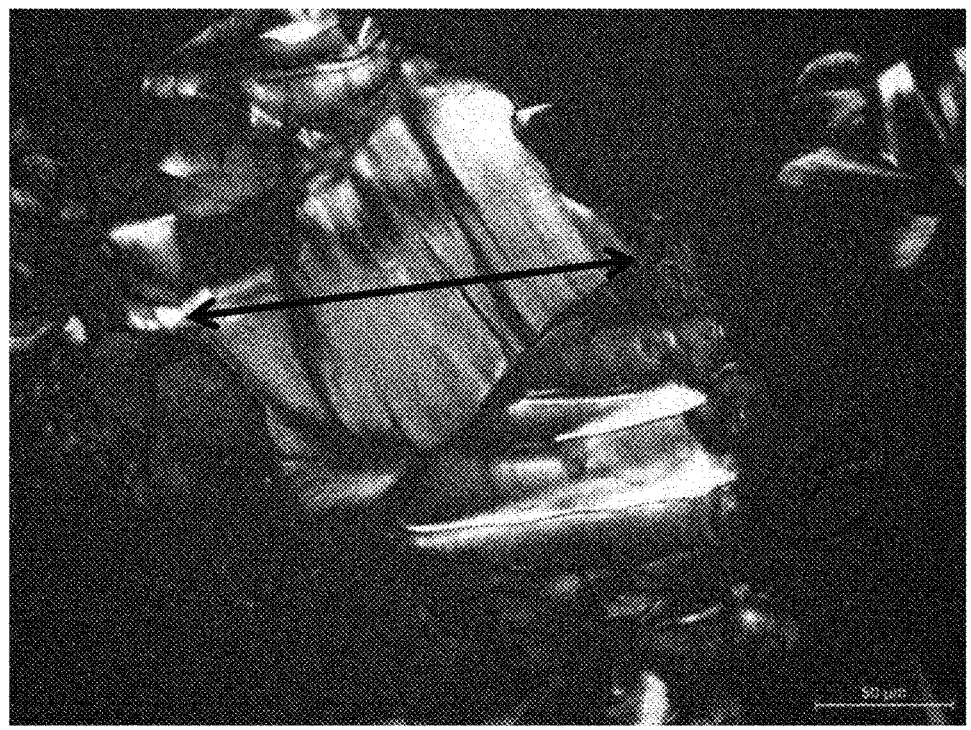
FIG. 1 is a photograph of crystal of the polyoxymethylene of Example B2 of the present disclosure when it is observed under a polarizing microscope as described in the [Crystal domain size] described later. The arrows in the figure indicate the major axis of an atypical domain of the crystal of the polyoxymethylene.

The following describes an embodiment of the present disclosure (hereinafter, simply referred to as the "present embodiment") in detail. The present embodiment is given for illustrating the present disclosure and does not limit the scope of the present disclosure to those given below. Various changes or modifications can be made to the present disclosure without departing from the spirit thereof.
<Polyoxymethylene>

In the polyoxymethylene of the present embodiment, a ratio of a low molecular weight component having a molecular weight of 10,000 or less in a molecular weight distribution is 7.0% or less of the total, where the molecular weight distribution is obtained by measurement by gel permeation chromatography (GPC) using polymethyl methacrylate (PMMA) as a standard substance.

The polyoxymethylene of the present embodiment may be a homopolymer in which the skeleton of the polyoxymethylene is composed entirely of oxymethylene units, or it may be a copolymer also containing an oxyalkylene unit in the skeleton.
[Low Molecular Weight Component]

The content of the low molecular weight component in the polyoxymethylene of the present embodiment is 7.0% or less, preferably 5.0% or less, and particularly preferably 4.5% or less. When the content is in the above ranges, a high impact resistant material can be obtained.

Examples of a method of controlling the content of the low molecular weight component within the above ranges include adjustment of the concentration of an initiator solution used during polymerization, use of a Lewis base, and adjustment of the polymerization time and temperature.

Note that the low molecular weight component defined in the present embodiment refers to a component having a molecular weight of 10,000 or less in a molecular weight distribution measured by gel permeation chromatography (GPC) in terms of a standard substance of PMMA. Specifically, it can be measured with the method described in the EXAMPLES section.
<<Polyoxymethylene of First Aspect>>

In a first aspect of the present disclosure, the polyoxymethylene of the present embodiment preferably contains 0.50 mass ppm or more and less than 100 mass ppm of boron atoms.
[Number Average Molecular Weight and Weight Average Molecular Weight]

The number average molecular weight Mn of the polyoxymethylene of the present embodiment is preferably more than 10,000, more preferably more than 25,000, and most preferably 30,000 to 300,000.

The weight average molecular weight Mw is preferably more than 10,000, more preferably more than 100,000, and most preferably 200,000 to 2,000,000.

It is generally known that the higher the average molecular weight is, the higher the mechanical strength is. However, if the average molecular weight is too high, the melt viscosity increases, which renders shape processing difficult. Within the above ranges, it is possible to provide a polymer having excellent mechanical properties and moldability.
[Molecular Weight Distribution]

The shape of the molecular weight distribution curve of the polyoxymethylene of the present embodiment is not limited. However, from the viewpoint of improving the mechanical strength, it is preferably a single-peaked shape having a peak where a peak top is at a logarithmic value of molecular weight log M (M is the molecular weight)=4.5 to 8.0, it is more preferably log M=4.5 to 7.0, and it is still more preferably a single-peaked shape having a peak where a peak top is at log M=4.5 to 6.0. Note that the log M is a logarithm of M with 10 as the base, and M is the molecular weight in gel permeation chromatography.

As used herein, the term "single-peaked" refers to a shape having only one arched peak.

In a case where the low molecular weight component is contained, the molecular weight distribution curve forms a shoulder with respect to the peak top or form a tail after the peak top in a region where the molecular weight is 10,000 or less, rather than being a part of the arched peak.

The number average molecular weight Mn, weight average molecular weight Mw and molecular weight distribution in the present embodiment can be measured by gel permeation chromatography (GPC). Specifically, they can be measured with the method described in the EXAMPLES section.
[Boron Atom Content]

The polyoxymethylene of the present embodiment preferably contains 0.50 mass ppm or more and more preferably 0.55 mass ppm or more of boron atoms. The upper limit of the content is preferably less than 100 mass ppm, more preferably 30.0 mass ppm or less, still more preferably 10 mass ppm or less, and particularly preferably 1.0 mass ppm or less.

The boron atom may be a component derived from an initiator, and the initiator used may be boron trifluoride or a dialkyl ether complex of boron trifluoride. The initiator may be added in a liquid state or may be sprayed.

The content of the boron atom in the polyoxymethylene of the present embodiment can be measured by ICP-MS. Specifically, it can be measured with the method described in the EXAMPLES section.
[Thermal Stability]

When the polyoxymethylene of the present embodiment is heated from 30° C. to 200° C. at a rate of 10° C./min in a nitrogen atmosphere and held at 200° C. for 60 minutes in thermogravimetry (TG), the rate of weight reduction is preferably 30 mass % or less, more preferably 25 mass % or less, still more preferably 20 mass % or less, and most preferably 15 mass % or less. The lower the thermogravimetric reduction rate is, the better the thermal stability is.

The weight reduction rate can be measured using an apparatus for thermogravimetry. Specifically, it can be measured with the method described in the EXAMPLES section.
[Impact Strength]

The Charpy impact strength (with notch) of the polyoxymethylene of the present embodiment is preferably 10.0 kJ/m$^2$ or more and more preferably 12.0 kJ/m$^2$ or more.

The Charpy impact strength (with notch) can be measured in accordance with ISO179 (JIS K7111). Specifically, it can be measured with the method described in the EXAMPLES section.
[Crystallinity]

The crystallinity of the polyoxymethylene of the present embodiment is not particularly limited, but the higher the crystallinity is, the higher the strength is. The melting point of first scan measured by differential scanning calorimetry (DSC) generally shows a correlation with the size of crystal, and the melting point of first scan is preferably 170° C. or higher. From the viewpoint of improving the mechanical strength, the melting point of first scan is more preferably 180° C. or higher, still more preferably 185° C. or higher, and particularly preferably 190° C. or higher. The polyoxymethylene of the present embodiment can also be produced by contacting a monomer in a solid state with a catalyst. However, since the polymerization proceeds in a solid phase in this method, a highly crystalline polymer can be obtained, which has a melting point of first scan higher than that of conventional polyoxymethylene.

Note that the melting point of first scan is a temperature of peak top of the melting point peak that is first detected when measurement of a sample, which has not been subjected to any special heat treatment after polymerization, is started under predetermined heating conditions. It can be measured by collecting a sample of 5 mg in an aluminum pan and then performing measurement by a program of raising the temperature from 30° C. to 200° C. at a heating rate of 20° C./min in a nitrogen atmosphere using a DSC apparatus (DSC3500) manufactured by NETZSCH.

The domain size of polyoxymethylene observed under a polarizing microscope generally indicates the size of a collection of crystal grains that distribute light in one direction, and the domain size is preferably 20 µm or more. From the viewpoint of improving the mechanical strength, the domain size is more preferably 30 µm or more, still more preferably 50 µm or more, and particularly preferably 75 µm or more. In a case where the polyoxymethylene of the present embodiment is produced by contacting a monomer in a solid state with a catalyst as described above, a highly crystalline polymer can be obtained because polymerization proceeds in a solid phase, and a domain size larger than that of conventional polyoxymethylene is observed under a polarizing microscope.

The domain size can be estimated by embedding a sample in epoxy resin, then preparing a section having a thickness of 2 µm with a microtome, observing the section with a polarizing microscope (main body LEITZ DMRP, camera LEICA DFC450 C), and measuring the major axis of an atypical domain of the same color.

<<Polyoxymethylene of Second Aspect>>

In a second aspect of the present disclosure, the polyoxymethylene (polyacetal) of the present embodiment preferably has a weight average molecular weight (Mw) of 650,000 or more measured by gel permeation chromatography (GPC) using PMMA as a standard substance.

Further, the polyoxymethylene of the present embodiment more preferably has a weight average molecular weight (Mw) of 750,000 or more and contains 0.5 mass ppm or more of boron atoms, 0.1 mass ppm or more of tungsten atoms, 0.1 mass ppm or more of molybdenum atoms, 5 ppm or more of vanadium atoms, 5 mass ppm or more of fluorine atoms, 0.5 ppm or more of chlorine atoms, or 0.5 ppm or more of sulfur atoms.

According to the polyoxymethylene of the present embodiment, the mechanical strength can be dramatically improved.

Polyoxymethylene contains an oxymethylene unit in the skeleton. The polyoxymethylene of the present embodiment may be a homopolymer whose skeleton is composed entirely of oxymethylene units, or it may be a copolymer containing an oxyalkylene unit.

[Average Molecular Weight]

The weight average molecular weight (Mw) of the polyoxymethylene of the present embodiment is preferably 650,000 or more. When the weight average molecular weight increases, the rigidity and strength increase, and the thermal stability improves because the number of terminals reduces. As a result, the mechanical strength can be dramatically improved. The weight average molecular weight is more preferably 700,000 or more, further preferably 750,000 or more, even more preferably 800,000 or more, still more preferably 1 million or more, and particularly preferably 1.2 million or more.

The number average molecular weight (Mn) of the polyoxymethylene of the present embodiment is preferably more than 20,000, more preferably more than 30,000, and still more preferably 34,000 or more. When the number average molecular weight (Mn) is within the above ranges, it is possible to provide a polymer having excellent mechanical properties and moldability.

The degree of dispersion (Mw/Mn) of the molecular weight distribution is preferably 10 or more, more preferably 13 or more, and still more preferably 15 or more. When the degree of dispersion (Mw/Mn) is within the above ranges, it is possible to provide a polymer having excellent mechanical properties and moldability.

The above weight average molecular weight (Mw) and number average molecular weight (Mn) and the following molecular weight distribution can be obtained by measurement by gel permeation chromatography (GPC) using PMMA as a standard substance. Specifically, they can be measured with the method described in the EXAMPLES section.

[Molecular Weight Distribution]

The molecular weight distribution of the polyoxymethylene of the present embodiment preferably has one or more peaks in a range where the logarithmic value of molecular weight log M is 5.0 or more and more preferably has one or more peaks in a range where the logarithmic value of molecular weight log M is 5.5 or more. Further, it preferably has one or more peaks in a range where the logarithmic value of molecular weight log M is 8.0 or less and more preferably has one or more peaks in a range where the logarithmic value of molecular weight log M is 7.0 or less. In this way, the mechanical strength can be dramatically improved. Note that the log M is a logarithm of M with 10 as the base, and M is the molecular weight in gel permeation chromatography.

The polyoxymethylene of the present embodiment may have a molecular weight distribution in a shape having a peak, shoulder or tail in a low molecular weight region (molecular weight of 10,000 or less). For polyoxymethylene, as the weight average molecular weight (Mw) increases, the mechanical strength increases, but the moldability may decrease because the melt viscosity increases. However, containing a low molecular weight component such as one having a molecular weight of 10,000 or less leads to a polymer having excellent moldability while maintaining high mechanical strength.

However, if the ratio of the low molecular weight component is high, the mechanical strength may be impaired, so that it is necessary to appropriately control the ratio of the low molecular weight component according to application. Therefore, the content of the low molecular weight component having a molecular weight of 10,000 or less is 7% or less, preferably 5% or less, particularly preferably 4.5% or less, and more particularly preferably 4% or less. Further, the content of the low molecular weight component having a molecular weight of 10,000 or less is preferably 0.1% or more and more preferably 0.3% or more. For the content of the low molecular weight component, the ratio of the low molecular weight component can be reduced by, for example, lowering the polymerization temperature in a polymerization step, setting mild stirring conditions, increasing the cooling rate, and increasing the temperature difference before and after cooling.

[Boron Atom, Tungsten Atom, Molybdenum Atom, Vanadium Atom, Fluorine Atom, Chlorine Atom, and Sulfur Atom Contents]

The polyoxymethylene of the present embodiment preferably contains 0.5 mass ppm or more of boron atoms, 0.1 mass ppm or more of tungsten atoms, 0.1 mass ppm or more of molybdenum atoms, 5 ppm or more of vanadium atoms, 5 mass ppm or more of fluorine atoms, 0.5 ppm or more of chlorine atoms, or 0.5 ppm or more of sulfur atoms.

When the polyoxymethylene of the present embodiment contains a boron atom, the content thereof is preferably 0.5 mass ppm or more and more preferably 0.55 mass ppm or more. The upper limit of the content is not particularly limited, but it is preferably 100 mass ppm or less and more preferably 30 mass ppm or less.

The boron atom may be a component derived from an initiator, and the initiator used may be boron trifluoride or a dialkyl ether complex of boron trifluoride.

The content of the boron atom in the polyoxymethylene of the present embodiment can be measured by ICP-MS. Specifically, it can be measured with the method described in the EXAMPLES section.

When the polyoxymethylene of the present embodiment contains a tungsten atom, the content thereof is preferably 0.1 mass ppm or more and more preferably 0.5 mass ppm or more. The upper limit of the content is not particularly limited, but it is preferably 20 mass ppm or less and more preferably 10 mass ppm or less.

The tungsten atom may be a component derived from an initiator, and the initiator used may be a heteropolyacid such as a hydrate or salt of phosphotungstic acid.

The content of the tungsten atom in the polyoxymethylene of the present embodiment can be measured by ICP-MS. Specifically, it can be measured with the method described in the EXAMPLES section.

When the polyoxymethylene of the present embodiment contains a molybdenum atom, the content thereof is preferably 0.1 mass ppm or more and more preferably 0.5 mass ppm or more. The upper limit of the content is not particularly limited, but it is preferably 20 mass ppm or less and more preferably 10 mass ppm or less.

The molybdenum atom may be a component derived from an initiator, and the initiator used may be a heteropolyacid such as a hydrate or salt of phosphomolybdic acid.

The content of the molybdenum atom in the polyoxymethylene of the present embodiment can be measured by ICP-MS. Specifically, it can be measured with the method described in the EXAMPLES section.

When the polyoxymethylene of the present embodiment contains a vanadium atom, the content thereof is preferably 5.0 mass ppm or more and more preferably 8.0 mass ppm or more. The upper limit of the content is not particularly limited, but it is preferably 20 mass ppm or less and more preferably 10 mass ppm or less.

The vanadium atom may be a component derived from an initiator, and the initiator used may be a heteropolyacid such as phosphomolybdovanadic acid.

The content of the vanadium atom in the polyoxymethylene of the present embodiment can be measured by ICP-MS. Specifically, it can be measured with the method described in the EXAMPLES section.

When the polyoxymethylene of the present embodiment contains a fluorine atom, the content thereof is preferably 5 mass ppm or more and more preferably 7 mass ppm or more. The upper limit of the content is not particularly limited, but it is preferably 50 mass ppm or less and more preferably 20 mass ppm or less.

The fluorine atom may be a component derived from an initiator, and the initiator used may be a strong protonic acid such as a fluorinated alkyl sulfonic acid such as trifluoromethanesulfonic acid or a fluorinated aryl sulfonic acid.

The content of the fluorine atom in the polyoxymethylene of the present embodiment can be measured with the IC method. Specifically, it can be measured with the method described in the EXAMPLES section.

When the polyoxymethylene of the present embodiment contains a chlorine atom, the content thereof is preferably 0.5 mass ppm or more and more preferably 1.0 mass ppm or more. The upper limit of the content is not particularly limited, but it is preferably 50 mass ppm or less and more preferably 20 mass ppm or less.

The chlorine atom may be a component derived from an initiator, and the initiator used may be perchloric acid or an ester thereof, tin tetrachloride, or the like.

The content of the chlorine atom in the polyoxymethylene of the present embodiment can be measured with the IC method. Specifically, it can be measured with the method described in the EXAMPLES section.

When the polyoxymethylene of the present embodiment contains a sulfur atom, the content thereof is preferably 0.5 mass ppm or more and more preferably 1.0 mass ppm or more. The upper limit of the content is not particularly limited, but it is preferably 50 mass ppm or less and more preferably 20 mass ppm or less.

The sulfur atom may be a component derived from an initiator, and the initiator used may be an alkyl sulfonic acid such as trifluoromethanesulfonic acid, sulfuric acid or an ester thereof, or the like.

The content of the sulfur atom in the polyoxymethylene of the present embodiment can be measured with the IC method. Specifically, it can be measured with the method described in the EXAMPLES section.

[Impact Strength]

The Charpy impact strength (with notch) of the polyoxymethylene of the present embodiment is preferably 10 kJ/m$^2$ or more, more preferably 12 kJ/m$^2$ or more, and still more preferably 14 kJ/m$^2$ or more.

The Charpy impact strength (with notch) can be measured in accordance with ISO179 (JIS K7111). Specifically, it can be measured with the method described in the EXAMPLES section.

[Melting Point]

The polyoxymethylene of the present embodiment preferably has a melting point of first scan of 185° C. or higher measured by differential scanning calorimetry (DSC). From the viewpoint of improving the mechanical strength, it is preferably 188° C. or higher. The polyoxymethylene of the present embodiment can be produced, for example, with the production method described later. In the method, since polymerization is performed at a relatively low temperature after cooling, it is considered that the crystallization rate is increased and the polymerization proceeds in a solid phase, and the melting point is higher than that of conventional polyoxymethylene. The melting point can be measured with the method described in the EXAMPLES section. Further, the polyoxymethylene of the present embodiment gradually undergoes crystallization even during storage period, and the melting point of first scan rises with time.

[Crystal Domain Size]

The polyoxymethylene of the present embodiment preferably has a domain size of 20 μm or more when it is observed under a polarizing microscope. From the viewpoint of improving the mechanical strength, it is preferably 30 μm or more, more preferably 50 μm or more, and particularly preferably 75 μm or more. Further, from the viewpoint of moldability, it is preferably 1,000 μm or less, more preferably 800 μm or less, and particularly preferably 400 μm or less. The polyoxymethylene of the present embodiment can be produced, for example, with the production method described later. In the method, since polymerization is performed at a relatively low temperature after cooling, it is considered that the crystallization rate is increased and the polymerization proceeds in a solid phase, and a domain size larger than that of conventional polyoxymethylene is observed. The domain size can be estimated by embedding a sample in epoxy resin, then preparing a section having a thickness of 2 μm with a microtome, observing the section with a polarizing microscope (main body LEITZ DMRP, camera LEICA DFC450C), and measuring the major axis of an atypical domain of the same color.

<Method of Producing Polyoxymethylene>

The method of producing polyoxymethylene of the present embodiment is a method of producing the above-described polyoxymethylene, which preferably includes subjecting a monomer forming a [—$CH_2$—O—] unit to cationic polymerization in the presence of an initiator.

The monomer and comonomer may be those used in the method of producing the polyoxymethylene of the first aspect or in the method of producing the polyoxymethylene of the second aspect, which will be described later.

The initiator is not particularly limited, and a common initiator for cationic polymerization may be used.

Further, during the production of polyoxymethylene of the present embodiment, additives such as a branching agent, a chain transfer agent, and an additive base may be used for various purposes.

In the method of producing polyoxymethylene of the present embodiment, the monomer may be polymerized in a solid state. When the monomer is polymerized in a solid state, the obtained polyoxymethylene has a small ratio of oligomer and tends to have high crystallinity.

In the method of producing polyoxymethylene of the present embodiment, an initiator may be used together with mesoporous silica having an average pore size of 1.0 nm to 5.5 nm.

In a preferred embodiment, an initiator supported by mesoporous silica in which an initiator is supported by mesoporous silica having an average pore size of 1.0 nm to 5.5 nm is used.

The following describes the details of the mesoporous silica used in the preferred embodiment.

[Mesoporous Silica]
[Pore Size of Mesoporous Silica]

The mesoporous silica used in the present embodiment has pores with an average pore size of 1.0 nm to 5.5 nm. When the pore size is in this range, the initiator penetrates into the pores and is easily supported. Further, the invasion of monomer causes polymerization in the pores, and the narrow reaction site limits the movement of growth ends. As a result, by-products of a cyclic body, that is, by-products of the low molecular weight component are suppressed. The average pore size of the pores is preferably 1.0 nm to 5.0 nm and more preferably 1.0 nm to 4.0 nm, from the viewpoint of monomer reaction rate.

The average pore size of the pores of the mesoporous silica can be calculated by analyzing a nitrogen adsorption isotherm obtained from a nitrogen adsorption test with the BHJ method.

[Structure of Mesoporous Silica]

The pores of the mesoporous silica used in the present embodiment preferably have a three-dimensional cylindrical structure in each pore. It is preferable that a large number of pores has a two-dimensional hexagonal structure (hexagonal ordered structure).

Specific examples of mesoporous silica having a two-dimensional hexagonal structure include MCM-41 and SBA-15.

The average thickness of the pore walls of the mesoporous silica used in the present embodiment is preferably 0.5 nm to 2.5 nm and more preferably 0.5 nm to 2.0 nm.

The average thickness of the pore walls of the mesoporous silica is a value obtained by arbitrarily selecting 10 pores in a cross-sectional SEM image, measuring the distance between a pore and the other pore closest to the pore for each pore (distance between pores), and averaging the distances.

When the pore shape and the average thickness of the pore walls are in the form and range described above, the initiator easily penetrates into the pores, and the initiator supported outside the pores can be reduced.

In the present embodiment, in order to make the initiator easily penetrate into the pores and reduce the initiator supported outside the pores, the shape of the mesoporous silica particle is preferably spherical, and the pores are preferably arranged radially outward from the center of the particle.

The initiator supported by mesoporous silica of the present embodiment may be one in which an initiator is supported by mesoporous silica described above, where the support may be realized by attachment, adhesion, adsorption or the like due to interaction such as hydrogen bond or intermolecular force, or by chemical bond.

In the present embodiment, the amount of mesoporous silica added in a stage of preparing the initiator supported by mesoporous silica is preferably 60 g or less and more preferably 55 g or less, and preferably 35 g or more and more preferably 40 g or more with respect to 1 mol of the initiator.

Further, in the present embodiment, the amount of mesoporous silica added in the polymerization system is preferably $3.0 \times 10^{-2}$ g or less and more preferably $2.5 \times 10^{-2}$ g or less, and preferably $5.0 \times 10^{-3}$ g or more and more preferably $1.0 \times 10^{-2}$ g or more with respect to 1 mol of the total amount of the monomer and comonomer.

When the amount of mesoporous silica added is within the above ranges, polyoxymethylene having high impact resistance and excellent thermal stability can be easily obtained because of a low ratio of the low molecular weight component.

Even in an embodiment other than the preferred embodiment using the initiator supported by mesoporous silica described above, it is preferable to mix the mesoporous silica and the initiator in advance before mixing them with the monomer, comonomer, additives, or the like in a polymerization system. More specifically, it is preferable to disperse the mesoporous silica in an initiator solution in which the initiator has been dissolved in a solvent and allow them to stand for a certain period of time.

In an embodiment other than the preferred embodiment described above, the pore size of the mesoporous silica, the structure of the mesoporous silica, the amount of the mesoporous silica added with respect to the initiator, the amount of the mesoporous silica added with respect to the total amount of the monomer and comonomer, and the like may be the same as that in the preferred embodiment described above.

<<Method of Producing Polyoxymethylene of First Aspect>>

In the first aspect of the present disclosure, the method of producing the polyoxymethylene of the present embodiment is not particularly limited, but it is preferably a method of subjecting a monomer forming a [—CH$_2$—O—] unit to cationic polymerization in the presence of an initiator.

Particularly in a case where the polyoxymethylene is polymerized in a solid phase, the initiator is preferably added in a liquid state, and may be added by spraying.

Further, in the method of producing the polyoxymethylene of the present embodiment, it is preferable to perform polymerization at a temperature equal to or lower than the boiling point of the monomer and then heat the monomer to a temperature equal to or higher than the boiling point of the monomer. When the monomer is polymerized at a temperature equal to or lower than the boiling point of the monomer and then heated to a temperature equal to or higher than the boiling point of the monomer, the obtained polyoxymethylene tends to have a small ratio of oligomer and a slightly reduced molecular weight.

[Monomer]

The monomer may be one that forms a [—CH$_2$—O—] unit in the polyoxymethylene. It is preferable to use cyclic ether.

A specific example is 1,3,5-trioxane.

[Comonomer]

The comonomer is preferably one that forms a unit represented by the structural formula of the following formula (I) in the polyoxymethylene.

[—O—(CH$_2$)$_x$—]   (I)

where x represents an integer of 2 to 8, and x=2 is particularly preferred.

A specific example is 1,3-dioxolane.

[Initiator]

In the present embodiment, a boron fluoride compound may be used, and boron fluoride, boron fluoride hydrate, and a coordination compound of boron fluoride and an organic compound (e.g. ethers) may be used as the initiator. These are practically preferable because they have a small effect on thermal decomposition of a polymer.

The initiator is desirably a boron trifluoride dialkyl ether complex, and particularly preferably a boron trifluoride diethyl ether complex and a boron trifluoride di-n-butyl ether complex.

The initiator may be added in a liquid state or may be sprayed.

The amount of the initiator added is preferably 3.5×10$^{-4}$ mol or less and more preferably 2.6×10$^{-4}$ mol or less, and preferably 5.0×10$^{-7}$ mol or more and more preferably 2.0×10$^{-5}$ mol or more, with respect to 1 mol of the total amount of the monomer and comonomer.

When the amount of the initiator added is within the above ranges, polyoxymethylene having a low content of low molecular weight component, high impact resistance, and excellent thermal stability can be easily obtained.

Generally, a strong protonic acid such as a fluoroalkyl or alkyl sulfonic acid represented by trifluoromethanesulfonic acid, and an aryl sulfonic acid, or a heteropolyacid such as phosphotungstic acid is used as an initiator to produce polyoxymethylene. However, when these initiators are used, their strong acidity causes polyoxymethylene to decompose, and the thermal stability is still deteriorated even if treatments such as terminal stabilization are performed.

By using a boron fluoride-based initiator as in the present embodiment, it is possible to provide a polymer having excellent thermal stability.

The initiator may be supported by mesoporous silica as described above, where the support may be realized by attachment, adhesion, adsorption or the like due to interaction such as hydrogen bond or intermolecular force, or by chemical bond.

[Additive]

In the production of the polyoxymethylene of the present embodiment, a branching agent, a chain transfer agent, and an additive base may be used for various purposes.

Preferred branching agents are polyfunctional epoxide, polyfunctional glycidyl ether, and polyfunctional cyclic formal.

A preferred chain transfer agent is the compound represented by the formula (II).

R$^1$—(—O—CH$_2$)$_r$—O—R$^2$   (II)

where r represents an integer, and R$^1$ and R$^2$ are alkyl groups having 1 to 6 carbon atoms.

It is preferably a compound represented by the formula (II) in which r is 1, and methylal is particularly preferred.

It is also acceptable to use a chain transfer agent that transfers protons for targeted production of polymer terminal OH groups.

Examples of the chain transfer agent include water, formic acid, methanol, ethanol, ethylene glycol, butanediol, glycerol or monohydric and polyhydric alcohols such as 1,1,1-trimethylolpropane. The use of these protic transfer agents initially results in a certain percentage of unstable terminal hemiacetal groups that lead to stable terminal alkylene-OH groups in subsequent hydrolysis. A preferred transfer agent is a polyhydric alcohol.

The chain transfer agent may usually be used in an amount of 20,000 mass ppm or less, preferably 100 mass ppm to 5,000 mass ppm, and particularly preferably 200 mass ppm to 2,000 mass ppm, based on the total of the monomer and comonomer.

In the first aspect of the present disclosure, the method of producing the polyoxymethylene of the present embodiment may perform the polymerization in the presence of an initiator and an added base.

A Lewis base may be used as a preferred added base. By using an appropriate added base, it is possible to suppress by-products of the low molecular weight component.

Preferred Lewis bases are Lewis bases containing an ester group, a phosphoric ester group, a thioether group, a nitrile group, a fluorocarbon group, and/or a carbonyl group.

[Lewis Base]

It is considered that a Lewis base has the function of capturing active carbocation terminals and suppressing their movements, which suppresses the generation of low molecular weight components by chain transfer reactions. The strength of the action involves electronic factors of the Lewis basic substituent and steric factors of a side chain.

The following describes a Lewis base suitable for the present embodiment.

When the Lewis base contains an ester group, it may be a compound represented by the general formula (1).

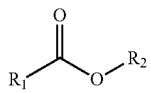

general formula (1)

where each of $R_1$ and $R_2$ independently represents an alkyl group having 1 to 8 carbon atoms. Specifically, each of $R_1$ and $R_2$ may be independently selected from the group consisting of methyl, ethyl, n-propyl, isopropyl, n-butyl, isobutyl, tert-butyl, and 2-ethylhexyl. The number of carbon atoms here may be 2 or more, 3 or more, or 4 or more, and 7 or less, 6 or less, or 5 or less. Further, the alkyl group may be substituted or unsubstituted, and may have a linear chain structure or a branched chain structure.

The general formula (1) is preferably a compound where $R_1$ is a methyl group and $R_2$ is an alkyl group having 2 to 8 carbon atoms, or $R_1$ is an alkyl group having 2 to 8 carbon atoms and $R_2$ is a methyl group.

It is particularly preferably a compound where $R_1$ is a methyl group and $R_2$ is an alkyl group having 4 to 8 carbon atoms, or a compound where $R_1$ is an alkyl group having 3 to 8 carbon atoms and $R_2$ is a methyl group.

Specific examples include ethyl acetate, propyl acetate, butyl acetate, t-butyl acetic acid, methyl butyrate, octyl butyrate, methyl propionate, and amyl hexylate.

When the Lewis base contains an ester group, it may be a compound represented by the general formula (2).

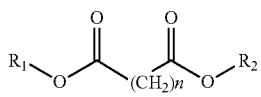

general formula (2)

where n is an integer of 1 to 8, and each of $R_1$ and $R_2$ independently represents an alkyl group having 1 to 8 carbon atoms. Specifically, each of $R_1$ and $R_2$ may be independently selected from the group consisting of methyl, ethyl, n-propyl, isopropyl, n-butyl, isobutyl, tert-butyl, and 2-ethylhexyl. The number of carbon atoms here may be 2 or more, 3 or more, or 4 or more, and 7 or less, 6 or less, or 5 or less. The general formula (2) is preferably a compound where n=1 to 8, and $R_1$ and $R_2$ are alkyl groups having 5 to 8 carbon atoms. The alkyl group may be substituted or unsubstituted, and may have a linear chain structure or a branched chain structure.

The general formula (2) is more preferably a compound where n=1, and $R_1$ and $R_2$ are alkyl groups having 1 to 8 carbon atoms, or a compound where n=7, and $R_1$ and $R_2$ are alkyl groups having 1 to 8 carbon atoms.

Specific examples include dimethyl malonate, dihexyl malonate, dimethyl azelate, and bis(2-ethylhexyl) azelate.

When the Lewis base contains a thioether group, it may be a compound represented by the general formula (3).

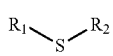

general formula (3)

where each of $R_1$ and $R_2$ independently represents an alkyl group having 1 to 6 carbon atoms. The number of carbon atoms here may be 2 or more or 3 or more, and 5 or less or 4 or less. In the general formula (3), $R_1$ and $R_2$ are preferably alkyl groups with a linear chain structure having 1 to 6 carbon atoms. Further, the alkyl group may be substituted or unsubstituted, and may have a linear chain structure or a branched chain structure.

Specific examples include diethyl sulfide, dipropyl sulfide, methyl propyl sulfide, and dihexyl sulfide.

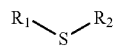

When the Lewis base contains a nitrile group, it may be a compound represented by the general formula (4).

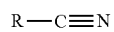

General formula (4)

where R represents a group having 1 to 13 carbon atoms. The number of carbon atoms here may be 2 or more, 3 or more, 4 or more, 5 or more, or 6 or more, and 12 or less, 11 or less, 10 or less, 9 or less, or 8 or less. In the general formula (4), R is preferably a hydrocarbon group having 1 to 13 carbon atoms. The hydrocarbon group may be aromatic or non-aromatic.

Specific examples include myristonitrile, phenylacetonitrile, and valeronitrile.

The Lewis base may be a compound containing a fluorine carbide group.

Among the compounds containing a fluorocarbon group, a compound containing a perfluoroalkyl group is preferred, and a compound containing a trifluoromethyl group is particularly preferred.

Specific examples include trifluoroacetylacetone and 3-acetylbenzotrifluoride.

The Lewis base may be a compound containing a carbonyl group, and is preferably a cyclic compound containing a carbonyl group.

Among the cyclic compounds containing a carbonyl group, a compound containing an ether bond in the ring structure is particularly preferred.

Specific examples include tetrahydro-2-methylfuran-3-one.

The Lewis base in the present embodiment is also preferably a compound containing a fluorocarbon group and a carbonyl group.

The method of adding the Lewis base and the order of adding the Lewis base in the present embodiment are not particularly limited, and the Lewis base may be added by being mixed with an initiator solution or may be directly mixed with the monomer before polymerization. The optimum adding method and adding order are different for each Lewis base.

Since the optimum amount of the Lewis base added differs depending on the initiator used and the scale of polymerization, it is necessary to appropriately optimize the adding amount according to the polymerization conditions. When the amount of substance of the Lewis base exceeds the optimum amount relative to the amount of substance of the initiator, the catalytic activity is impaired, which causes an increase in low molecular weight components and a decrease in polymer yield. When the amount of substance of the Lewis base falls below the optimum amount relative to the amount of substance of the initiator, the ratio of the low molecular weight component does not change.

The ratio by molar quantity (mol/mol) of the amount of the Lewis base added with respect to the amount of the initiator added is preferably in a range of 0.01 to 200, more preferably 0.01 to 150, and still more preferably 0.01 to 60.

In particular, the Lewis base containing an ester described above, which has a small inhibitory effect on polymerization reaction, can also be used as a solvent for the initiator. In this case, the ratio by molar quantity (mol/mol) of the amount of the Lewis base added with respect to the amount of the initiator added may be 60 to 200 and preferably 60 to 150, depending on the concentration.

The above-described Lewis base has the function of capturing active carbocation terminals to suppress their movement. Therefore, it works essentially the same when an initiator other than a boron fluoride-based one is used.

The method of adding the Lewis base and the order of adding the Lewis base are not particularly limited, and the Lewis base may be added by being mixed with an initiator solution or may be directly mixed with the monomer before polymerization. The optimum adding method and adding order are different for each Lewis base.

Since the optimum amount of the Lewis base added differs depending on the initiator used and the scale of polymerization, it is necessary to appropriately optimize the adding amount according to the polymerization conditions. When the amount of substance of the Lewis base exceeds the optimum amount relative to the amount of substance of the initiator, the activity of the initiator is impaired, which causes an increase in low molecular weight components and a decrease in polymer yield. When the amount of substance of the Lewis base falls below the optimum amount relative to the amount of substance of the initiator, the content of the low molecular weight component does not change.

<<Method of Producing Polyoxymethylene of Second Aspect>>

In the second aspect of the present disclosure, the method of producing the polyoxymethylene of the present embodiment is preferably a method of subjecting a monomer forming a [—$CH_2$—O—] unit to cationic polymerization in the presence of an initiator.

Further, the method of producing the polyoxymethylene of the present embodiment preferably includes a step of polymerizing the monomer at 10° C. or lower.

According to the method of producing the polyoxymethylene of the present embodiment, it is possible to produce polyoxymethylene with dramatically improved mechanical strength. Specifically, it is considered that, by setting the above polymerization conditions, the crystallization of polyoxymethylene can be promoted by removing the heat of polymerization and the heat of crystallization, and side reactions can be suppressed at the same time. As a result, the obtained polyoxymethylene has a high molecular weight. From the viewpoint of the heat removing rate, the polymerization temperature in the polymerization step is preferably 25° C. or lower, more preferably 5° C. or lower, still more preferably −20° C. or lower, and particularly preferably −78° C. or lower. By lowering the polymerization temperature, crystallization is promoted, and side reactions are suppressed at the same time. As a result, the entire polymer can have an increased molecular weight and can be further crystallized, and the low molecular weight component can be further reduced.

In the present embodiment, when the melting point of the monomer and the comonomer exceeds the polymerization temperature described above, it is preferable to heat the monomer to a temperature equal to or higher than the melting point before adding a catalyst and to move or convert the monomer to a low temperature environment immediately before or after the addition of the catalyst, from the viewpoint of good mixing of the monomer, the comonomer and the catalyst. That is, it is preferable to include heating the monomer to a temperature equal to or higher than the melting point to melt the monomer and cooling the melted monomer to a temperature equal to or lower than the melting point during the polymerization reaction. Specifically, in a case where the cationic polymerization is performed using 1,3,5-trioxane as the monomer, for example, the 1,3,5-trioxane is heated to 63° C., which is the melting point of 1,3,5-trioxane, or higher, and preferably moved or converted to a low temperature environment immediately before or after the addition of a catalyst. It is more preferable that, in the polymerization step, the polymerization is performed in a low temperature environment immediately after the addition of a catalyst. In this case, the yield can be maintained without lowering the monomer reaction rate.

In the polymerization step, there is no need to set the polymerization temperature to 10° C. or lower throughout the polymerization step, and the polymerization temperature may be 10° C. or lower only in a part of the polymerization step. For example, in the polymerization step, the polymerization temperature may be set to a low temperature at the initial stage of the polymerization step, and the polymerization may be performed in a temperature environment other than a low temperature environment in the middle or late stage of the polymerization step. Note that when the monomer is placed in a temperature environment equal to or higher than the melting point of the monomer after a polymerization step performed at a low temperature, the molecular weight can be adjusted because the molecular chain has been broken by a chain transfer reaction.

In the present embodiment, the polymerization reaction time is not particularly limited. For example, the polyoxymethylene of the present embodiment can be obtained even if the reaction time during which the polymerization temperature is 10° C. or lower is relatively short or relatively long. The required polymerization time depends on the type of the initiator, the amount of substance ratio of the initiator to the monomer, the reaction container, and stirring mechanism.

[Catalyst/Initiator]

In the method of producing polyoxymethylene of the present embodiment, the catalyst/initiator used in the polymerization step is not limited, and a common catalyst/initiator for cationic polymerization can be used. However, a strong protonic acid such as a fluoroalkyl sulfonic acid represented by trifluoromethanesulfonic acid, alkyl sulfonic acid and an aryl sulfonic acid, or a heteropolyacid such as phosphotungstic acid is generally used as a catalyst (initiator) to produce polyoxymethylene. In a case of using these catalysts, the strong acidity causes polymer chains to decompose, and there may still be an essential problem in thermal stability even if treatments such as terminal stabilization are performed. Therefore, from the viewpoint of thermal stability, it is preferable to use a boron fluoride compound having lower acidity as the catalyst to be used. It is more preferably boron fluoride, boron fluoride hydrate, or a coordination compound of boron fluoride and an organic compound (for example, ethers), still more preferably a boron trifluoride dialkyl ether complex, and particularly preferably a boron trifluoride diethyl ether complex or a boron trifluoride di-n-butyl ether complex.

[Monomer]

In the method of producing the polyoxymethylene of the present embodiment, the monomer is not particularly limited as long as it forms [—$CH_2$—O—] unit. It is preferable to use cyclic ether and more preferable to use 1,3,5-trioxane.

[Comonomer]

The polyoxymethylene of the present embodiment may be a homopolymer or a copolymer. When it is a copolymer, the comonomer preferably forms a unit represented by the structural formula of the following formula (I) in the polyoxymethylene, from the viewpoint of mechanical properties.

$$[-\mathrm{O}-(\mathrm{CH}_2)_x-] \quad (\mathrm{I})$$

where x represents an integer of 2 to 8, and x=2 is particularly preferred.

A specific example is 1,3-dioxolane.

[Additive]

During the production of the polyoxymethylene of the present embodiment, the molecular weight may be adjusted by using a branching agent or a chain transfer agent for various purposes. Preferred branching agents are polyfunctional epoxide, polyfunctional glycidyl ether, and polyfunctional cyclic formal. A preferred chain transfer agent is a compound represented by the formula (II).

$$R^1-(-\mathrm{O}-\mathrm{CH}_2)_r-\mathrm{O}-R^2 \quad (\mathrm{II})$$

where r represents an integer, and $R^1$ and $R^2$ are alkyl groups having 1 to 6 carbon atoms. It is preferably a compound represented by the formula (II) in which r is 1, and methylal is particularly preferred.

It is also acceptable to use a chain transfer agent that transfers protons for targeted production of polymer terminal OH groups. Examples of the group include water, formic acid, methanol, ethanol, ethylene glycol, butanediol, glycerol or monohydric and polyhydric alcohols such as 1,1,1-trimethylolpropane. The use of these protic transfer agents initially results in a certain percentage of unstable terminal hemiacetal groups that lead to stable terminal alkylene-OH groups in subsequent hydrolysis. A preferred transfer agent is a polyhydric alcohol.

The chain transfer agent is usually used in an amount of 20,000 mass ppm or less, preferably 100 mass ppm to 5,000 mass ppm, and particularly preferably 200 ppm to 2,000 ppm, based on the total amount of the monomer and monomer.

EXAMPLES

The following examples are described without limiting the present disclosure.

Example A and Comparative Example A, Example Z

The analysis method and evaluation method used in Examples A and Comparative Examples A, and Example Z are as follows.

[Measurement of Boron Atom Content]

Approximately 0.1 g of the polyoxymethylene sample obtained in Examples and Comparative Examples was precisely weighed in a decomposition container manufactured by TFM, sulfuric acid and nitric acid were added, pressurized acid decomposition was performed with a microwave decomposition apparatus, and the decomposition solution was adjusted to a constant volume of 50 mL and subjected to ICP-MS measurement. An apparatus manufactured by Agilent Technologies (Agilent 7500CX) was used in the ICP-MS measurement.

[Measurement of Weight Average Molecular Weight, Number Average Molecular Weight, and Molecular Weight Distribution]

The Mn, Mw, and molecular weight distribution of the polyoxymethylene obtained in Examples and Comparative Examples were measured using a GPC apparatus (HPLC8320) manufactured by Tosoh Corporation. PMMA was used as a standard substance.

Further, when the molecular weight distribution curve had a single-peaked shape, the position of the peak top was determined.

Hexafluoroisopropanol (HFIP) in which 0.4 mass % of sodium trifluoroacetate had been dissolved was used as an eluent.

The polyoxymethylene was dissolved in the eluent to prepare a sample solution having a concentration of 0.5 mg/mL.

One K-G 4A manufactured by Shodex and two KF-606M manufactured by Shodex were used as columns to substitute the solvent in the hexafluoroisopropanol.

An RI (refractive index) detector was used as a detector.

The flow rate was 0.3 mL/min.

The column temperature was 40° C.

The injection volume of the sample solution was 60 μL.

[Measurement of Content of Low Molecular Weight Component]

The content of the low molecular weight component was calculated by assuming that a peak of normal distribution with a standard deviation of 0.3 was at a position of log M=4.14 in the molecular weight distribution and then assuming that a peak of normal distribution having a peak top at log M=3.0 to 3.7 was a peak of low molecular weight component, and determining a ratio of the area of the peak of low molecular weight component to the total area of the molecular weight distribution curve by peak fitting.

[Thermogravimetry]

The polyoxymethylene obtained in Examples and Comparative Examples was measured by the following program in a nitrogen atmosphere using a TG device (TG-DTA2500) manufactured by NETZSCH Japan K.K. to calculate the weight reduction rate (mass %) from the start to the end of the measurement (from 30° C. to 200° C.).

The amount of the sample was approximately 10 mg.

The measurement atmosphere was nitrogen (20 mL/min).

The measurement conditions were (1) raising the temperature from 30° C. to 200° C. at 10° C./min, (2) holding the sample at 200° C. for 60 minutes, and (3) calculating the weight reduction rate (mass %) from 30° C. to 200° C.

[Charpy Impact Strength (with Notch)]

Test method: ISO179 (JIS K7111)

Strip test piece: a strip test piece with a notch in the center was prepared using the polyoxymethylene obtained in Examples and Comparative Examples.

Both ends of the strip test piece were supported so that the strip test piece was kept horizontal, and the surface opposite to the notched surface was struck by a striking hammer to destroy the test piece. The energy required to break the test piece was determined and divided by the cross-sectional area of the test piece to calculate the Charpy impact strength ($kJ/m^2$).

Evaluation was performed according to the following evaluation criteria.

Excellent: 12.0 $kJ/m^2$ or more, good: 10.0 $kJ/m^2$ to less than 12.0 $kJ/m^2$, and practicable: less than 10.0 $kJ/m^2$.

Example A1

First, 2 g of 1,3,5-trioxane (manufactured by Tokyo Kasei Sales Co., Ltd., melting point: 64° C., boiling point: 114.5° C., all of the following reagents were manufactured by Tokyo Kasei Sales Co., Ltd. except 1,3-dioxolane and cyclohexane) was weighed and put into a fluororesin test tube having a diameter of 16 mm together with a stirrer, then 50 µL of butyl acetate was added as a Lewis base, and a septum cap was covered. The test tube was fixed in an oil bath that had been heated to 90° C. to melt the 1,3,5-trioxane, then 60 µL of 1,3-dioxolane (manufactured by Sigma-Aldrich) was added as a comonomer component, and 100 µL of a boron trifluoride dibutyl ether solution prepared with cyclohexane (manufactured by Sigma-Aldrich) at 0.06 mmol/mL was added to initiate polymerization. After 15 minutes, the test tube was taken out from the oil bath and immersed in ice water, the septum cap was removed, and 1 mL of a 20% triethylamine/ethanol solution and 2.5 mL of acetone were added respectively to terminate the polymerization. The obtained polymer was crushed and taken out, washed, then filtered, and vacuum dried at 25° C. for 2 hours. As a result, about 2 g of polyoxymethylene was obtained.

The molecular weight distribution of the polymer had a single-peaked shape, and the thermogravimetric reduction rate was 7 mass %.

Example A2

Example A2 was performed in the same manner as in Example A1 except that 40 µL of 3-acetylbenzotrifluoride was added instead of the butyl acetate.

Example A3

Example A3 was performed in the same manner as in Example A1 except that the butyl acetate was not added and the polymerization was stopped 60 minutes after the start of the polymerization.

Example A4

First, 2 g of 1,3,5-trioxane (melting point: 64° C., boiling point: 114.5° C.) was weighed and put into a fluororesin test tube having a diameter of 16 mm together with a stirrer, and a septum cap was covered. The test tube was fixed in an oil bath that had been heated to 90° C. to melt the 1,3,5-trioxane, then 60 µL of 1,3-dioxolane was added as a comonomer component, and 100 µL of a boron trifluoride dibutyl ether solution prepared with cyclohexane at 0.06 mmol/mL was added to initiate polymerization.

Five minutes after the start of polymerization, the test tube was transferred to an oil bath that had been heated to 140° C. and fixed.

After 10 minutes (15 minutes after the start of polymerization), the test tube was taken out from the oil bath and immersed in ice water, the septum cap was removed, and 1 mL of a 20% triethylamine/ethanol solution and 2.5 mL of acetone were added respectively to terminate the polymerization. The obtained polymer was crushed and taken out, washed, then filtered, and vacuum dried at 25° C. for 2 hours. As a result, about 2 g of polyoxymethylene was obtained.

Example A5

(Initiator Support)

First, 38 mg of mesoporous silica MCM41 (average pore size: 2.9 nm, average thickness of pore walls: 0.9 nm) sold by Sigma-Aldrich Japan was weighed and mixed with 5 mL of cyclohexane and dispersed, 5 mL of a boron trifluoride dibutyl ether solution prepared with cyclohexane at 0.19 mmol/mL was added, and the mixture was stirred, allowed to stand for 3 hours or longer and then filtered. Next, 20 mg of the filtered material was weighed and mixed with 5 mL of cyclohexane and dispersed to prepare a 4 mg/mL mesoporous silica-supported boron trifluoride dibutyl ether/cyclohexane dispersion. All operations were performed in a nitrogen atmosphere.

(Polymerization)

First, 2 g of 1,3,5-trioxane (melting point: 64° C., boiling point: 114.5° C.) was weighed and put into a fluororesin test tube having a diameter of 16 mm together with a stirrer, and a septum cap was covered. The test tube was fixed in an oil bath that had been heated to 90° C. to melt the 1,3,5-trioxane, then 60 µL of 1,3-dioxolane was added as a comonomer component, and 100 µL of the mesoporous silica-supported boron trifluoride dibutyl ether/cyclohexane dispersion was added to initiate polymerization. After 15 minutes, the test tube was taken out from the oil bath and immersed in ice water, the septum cap was removed, and 1 mL of a 20% triethylamine/ethanol solution and 2.5 mL of acetone were added respectively to terminate the polymerization. The obtained polymer was crushed and taken out, washed, then filtered, and vacuum dried at 25° C. for 2 hours. As a result, about 2 g of polyoxymethylene was obtained.

Example A6

First, 2 g of 1,3,5-trioxane (melting point: 64° C., boiling point: 114.5° C.) was weighed and put into a fluororesin test tube having a diameter of 16 mm together with a stirrer, and a septum cap was covered. The test tube was fixed in an oil bath that had been heated to 90° C. to melt the 1,3,5-trioxane, then 60 µL of 1,3-dioxolane was added as a comonomer component, and 20 µL of a boron trifluoride dibutyl ether solution prepared with cyclohexane at 0.19 mmol/mL was added to initiate polymerization. After 15 minutes, the test tube was taken out from the oil bath and immersed in ice water, the septum cap was removed, and 1 mL of a 20% triethylamine/ethanol solution and 2.5 mL of acetone were added respectively to terminate the polymerization. The obtained polymer was crushed and taken out, washed, then filtered, and vacuum dried at 25° C. for 2 hours. As a result, about 2 g of polyoxymethylene was obtained.

Examples A7 to A12

Polymerization was performed in the same manner as in Examples A1 to A6 respectively except that the 1,3-dioxolane, which was a comonomer component, was not added.

Example A13

First, 10 g of 1,3,5-trioxane (melting point: 64° C., boiling point: 114.5° C.) was weighed and put into a fluororesin test tube having a diameter of 30 mm together with a stirrer, and a septum cap was covered. The test tube was immersed in an oil bath that had been heated to 70° C. to melt the 1,3,5-trioxane, and 300 µL of 1,3-dioxolane as a comonomer component was added into the test tube. The test tube was taken out from the oil bath and immersed in an ice bath for cooling and solidification. The obtained 1,3,5-trioxane and 1,3-dioxolane were pulverized by a pulverizer (ZM200 manufactured by Retsch), 2 g of the pulverized powder was weighed and put into a fluororesin test tube having a diameter of 16 mm together with a stirrer, and 50 µL of a boron trifluoride dibutyl ether solution prepared with cyclohexane at 0.12 mmol/mL was added in an environment of 25° C. to initiate polymerization. After 30 minutes, 1 mL of a 20% triethylamine/ethanol solution and 2.5 mL of acetone were added respectively to terminate the polymerization. The obtained polymer was crushed and taken out, washed, then filtered, and vacuum dried at 25° C. for 2 hours to obtain polyoxymethylene.

Examples A14 to A16

Examples A14 to A16 were respectively performed in the same manner as in Example A13, except that the polymerization was performed at a polymerization temperature of 40° C. to 60° C. using an oil bath.

Example A17

First, 2 g of 1,3,5-trioxane (melting point: 64° C., boiling point: 114.5° C.) without pulverization was weighed and put into a fluororesin test tube having a diameter of 16 mm together with a stirrer, and 50 μL of a boron trifluoride dibutyl ether solution prepared with cyclohexane at 0.12 mmol/mL was added in an environment of 25° C. to initiate polymerization. After 180 minutes, 1 mL of a 20% triethylamine/ethanol solution and 2.5 mL of acetone were added respectively to terminate the polymerization. The obtained polymer was crushed and taken out, washed, then filtered, and vacuum dried at 25° C. for 2 hours to obtain polyoxymethylene.

Example A18

First, 2 g of 1,3,5-trioxane powder (melting point: 64° C., boiling point: 114.5° C.) that had been pulverized by a pulverizer (same as above) was weighed and put into a fluororesin test tube having a diameter of 16 mm together with a stirrer, and 50 μL of a boron trifluoride dibutyl ether solution prepared with cyclohexane at 0.12 mmol/mL was added in an environment of 25° C. to initiate polymerization. After 30 minutes, 1 mL of a 20% triethylamine/ethanol solution and 2.5 mL of acetone were added respectively to terminate the polymerization. The obtained polymer was crushed and taken out, washed, then filtered, and vacuum dried at 25° C. for 2 hours to obtain polyoxymethylene.

Examples A19 to A21

Examples A19 to A21 were respectively performed in the same manner as in Example A18, except that the polymerization was performed at a polymerization temperature of 40° C. to 60° C. using an oil bath.

Comparative Example A1

Polymerization was performed in the same manner as in Example A1 except that the butyl acetate was not added.

Comparative Example A2

Polymerization was performed in the same manner as in Comparative Example 1 except that the 1,3-dioxolane, which was a comonomer component, was not added.

Comparative Example A3

First, 2 g of 1,3,5-trioxane (melting point: 64° C., boiling point: 114.5° C.) was weighed and put into a fluororesin test tube having a diameter of 16 mm together with a stirrer, and a septum cap was covered. The test tube was fixed in an oil bath that had been heated to 90° C. to melt the 1,3,5-trioxane, then 60 μL of 1,3-dioxolane was added as a comonomer component, and 100 μL of a phosphotungstic acid 27 hydrate solution prepared with dimethyl adipate at $4.4 \times 10^4$ mmol/mL was added to initiate polymerization. After 15 minutes, the test tube was taken out from the oil bath and immersed in ice water, the septum cap was removed, and 1 mL of a 20% triethylamine/ethanol solution and 2.5 mL of acetone were added respectively to terminate the polymerization. The obtained polymer was crushed and taken out, washed, then filtered, and vacuum dried at 25° C. for 2 hours. As a result, about 2 g of polyoxymethylene was obtained.

Comparative Example A4

Polymerization was performed in the same manner as in Comparative Example 3 except that the 1,3-dioxolane, which was a comonomer component, was not added.

Comparative Example A5

First, 2 g of 1,3,5-trioxane (melting point: 64° C., boiling point: 114.5° C.) was weighed and put into a fluororesin test tube having a diameter of 16 mm together with a stirrer, and a septum cap was covered. The test tube was fixed in an oil bath that had been heated to 90° C. to melt the 1,3,5-trioxane, then 60 μL of 1,3-dioxolane was added as a comonomer component, and 100 μL of a trifluoromethanesulfonic acid solution prepared with 1,4-dioxane at $1 \times 10^{-3}$ mmol/mL was added to initiate polymerization. After 15 minutes, the test tube was taken out from the oil bath and immersed in ice water, the septum cap was removed, and 1 mL of a 20% triethylamine/ethanol solution and 2.5 mL of acetone were added respectively to terminate the polymerization. The obtained polymer was crushed and taken out, washed, then filtered, and vacuum dried at 25° C. for 2 hours. As a result, about 2 g of polyoxymethylene was obtained.

Comparative Example A6

Polymerization was performed in the same manner as in Comparative Example 5, except that the 1,3-dioxolane, which was a comonomer component, was not added.

Example Z

First, 10 g of 1,3,5-trioxane (melting point: 64° C., boiling point: 114.5° C.) was weighed and put into a fluororesin test tube having a diameter of 30 mm together with a stirrer, and a septum cap was covered. The test tube was immersed in an oil bath that had been heated to 70° C. to melt the 1,3,5-trioxane. The test tube was taken out from the oil bath, 6 μL of a 37% formaldehyde/methanol solution (manufactured by Tokyo Kasei Sales Co., Ltd.) was added and mixed, and then the test tube was immersed in an ice bath for cooling and solidification. The obtained 1,3,5-trioxane was pulverized by a pulverizer (ZM200 manufactured by Retsch), and 2 g of the pulverized powder was weighed and put into a fluororesin test tube having a diameter of 16 mm together with a stirrer to initiate polymerization in an environment of 50° C. After 24 hours, 5 mL of distilled water was added to terminate the polymerization. The obtained polymer was crushed and taken out, washed, then filtered, and vacuum dried at 25° C. for 2 hours to obtain polyoxymethylene.

Tables 1 to 5 summarize the polymerization conditions and results of each Example and Comparative Example.

TABLE 1

|  | Example A1 | Example A2 | Example A3 | Example A4 | Example A5 | Example A6 |
| --- | --- | --- | --- | --- | --- | --- |
| Initiator | Boron trifluoride dibutyl ether | | | | | |
| Ratio of initiator to monomer [Cat]/[M] (mol/mol) | $2.6 \times 10^{-4}$ | | | | $1.73 \times 10^{-2}$ (*) | $1.6 \times 10^{-4}$ |
| Comonomer component | Contained | | | | | |
| Additive | Butyl acetate | 3-acetylben-zotrifluoride | Not contained | Not contained | Not contained | Not contained |
| Polymerization time (min) | 15 | 15 | 60 | 15 | 15 | 15 |
| Molecular weight distribution (—) | Single-peaked | Single-peaked | Single-peaked | Single-peaked | Single-peaked | Single-peaked |
| Peak top position logM (—) | 4.9 | 5.0 | 4.7 | 5.0 | 4.7 | 4.8 |
| Content of low molecular weight component (%) | 4.5 | 3.9 | 6.5 | 6.0 | 6.0 | 6.1 |
| Number average molecular weight Mn (—) | 34,811 | 50,730 | 25,657 | 32,358 | 31,024 | 33,055 |
| (the lower row indicates two significant figures) | $(3.5 \times 10^4)$ | $(5.1 \times 10^4)$ | $(2.6 \times 10^4)$ | $(3.2 \times 10^4)$ | $(3.1 \times 10^4)$ | $(3.3 \times 10^4)$ |
| Weight average molecular weight Mw (—) | 203,913 | 263,702 | 170,112 | 159,991 | 160,932 | 302,742 |
| (the lower row indicates two significant figures) | $(2.0 \times 10^5)$ | $(2.6 \times 10^5)$ | $(1.7 \times 10^5)$ | $(1.6 \times 10^5)$ | $(1.6 \times 10^5)$ | $(3.0 \times 10^5)$ |
| Boron atom content of polymer (mass ppm) | 0.67 | 0.65 | 0.66 | 0.64 | 0.64 | 0.65 |
| Thermogravimetric reduction rate (mass %) | 7 | 6 | 7 | 8 | 6 | 4 |
| Impact strength with notch (—) | Good | Good | Good | Good | Good | Good |

(*) In Example 5, it is a ratio of mesoporous silica-supported initiator to monomer [Cat-MPS]/[M] (g/mol)

TABLE 2

|  | Example A7 | Example A8 | Example A9 | Example A10 | Example A11 | Example A12 |
| --- | --- | --- | --- | --- | --- | --- |
| Initiator | Boron trifluoride dibutyl ether | | | | | |
| Ratio of initiator to monomer [Cat]/[M] (mol/mol) | $2.6 \times 10^{-4}$ | | | | $1.80 \times 10^{-2}$ (*) | $1.6 \times 10^{-4}$ |
| Comonomer component | Not contained | | | | | |
| Additive | Butyl acetate | 3-acetylben-zotrifluoride | Not contained | Not contained | Not contained | Not contained |
| Polymerization time (min) | 15 | 15 | 60 | 15 | 15 | 15 |
| Molecular weight distribution (—) | Single-peaked | Single-peaked | Single-peaked | Single-peaked | Single-peaked | Single-peaked |
| Peak top position logM (—) | 5.4 | 5.3 | 5.0 | 5.6 | 5.2 | 5.1 |
| Content of low molecular weight component (%) | 3.3 | 2.7 | 6.1 | 4.8 | 4.8 | 4.9 |
| Number average molecular weight Mn (—) | 40,243 | 54,162 | 28,089 | 37,790 | 36,456 | 38,487 |
| (the lower row indicates two significant figures) | $(4.0 \times 10^4)$ | $(5.4 \times 10^4)$ | $(2.8 \times 10^4)$ | $(3.8 \times 10^4)$ | $(3.6 \times 10^4)$ | $(3.8 \times 10^4)$ |
| Weight average molecular weight Mw (—) | 208,456 | 268,245 | 174,655 | 164,534 | 165,475 | 307,285 |
| (the lower row indicates two significant figures) | $(2.1 \times 10^5)$ | $(2.7 \times 10^5)$ | $(1.7 \times 10^5)$ | $(1.6 \times 10^5)$ | $(1.7 \times 10^5)$ | $(3.1 \times 10^5)$ |
| Boron atom content of polymer (mass ppm) | 0.66 | 0.65 | 0.62 | 0.67 | 0.66 | 0.55 |
| Thermogravimetric reduction rate (mass %) | 12 | 10 | 13 | 14 | 14 | 8 |
| Impact strength with notch (—) | Excellent | Excellent | Good | Excellent | Excellent | Excellent |

(*) In Example 11, it is a ratio of mesoporous silica-supported initiator to monomer [Cat-MPS]/[M] (g/mol)

TABLE 3

|  | Comparative Example A1 | Comparative Example A2 | Comparative Example A3 | Comparative Example A4 | Comparative Example A5 | Comparative Example A6 |
| --- | --- | --- | --- | --- | --- | --- |
| Initiator | Boron trifluoride dibutyl ether | Boron trifluoride dibutyl ether | Phospho-tungstic acid | Phospho-tungstic acid | Trifluorometh-anesulfonic acid | Trifluorometh-anesulfonic acid |
| Ratio of initiator to monomer [Cat]/[M] (mol/mol) | $2.6 \times 10^{-4}$ | $2.6 \times 10^{4}$ | $1.9 \times 10^{-6}$ | $2.0 \times 10^{-6}$ | $4.3 \times 10^{-6}$ | $4.5 \times 10^{-6}$ |
| Comonomer component | Contained | Not contained | Contained | Not contained | Contained | Not contained |
| Additive | Not contained | | | | | |
| Polymerization time (min) | 15 | 15 | 15 | 15 | 15 | 15 |
| Molecular weight distribution (—) | Double-peaked | Double-peaked | Single-peaked | Single-peaked | Single-peaked | Single-peaked |
| Peak top position logM (—) | — | — | 4.8 | 5.0 | 4.7 | 5.1 |
| Content of low molecular weight component (%) | 14.0 | 10.5 | 4.2 | 3.0 | 3.2 | 2.2 |
| Number average molecular weight Mn (—) | 22,083 | 26,938 | 51,264 | 59,743 | 57,694 | 60,623 |
| (the lower row indicates two significant figures) | $(2.2 \times 10^4)$ | $(2.7 \times 10^4)$ | $(5.1 \times 10^4)$ | $(6.0 \times 10^4)$ | $(5.8 \times 10^4)$ | $(6.1 \times 10^4)$ |
| Weight average molecular weight Mw (—) | 174,857 | 197,463 | 169,171 | 197,152 | 190,390 | 200,056 |
| (the lower row indicates two significant figures) | $(1.7 \times 10^5)$ | $(2.0 \times 10^5)$ | $(1.7 \times 10^5)$ | $(2.0 \times 10^5)$ | $(1.9 \times 10^5)$ | $(2.0 \times 10^5)$ |
| Boron atom content of polymer (mass ppm) | 0.66 | 0.67 | Not detected | Not detected | Not detected | Not detected |
| Thermogravimetric reduction rate (mass %) | 12 | 15 | 38 | 48 | 39 | 55 |
| Impact strength with notch (—) | Poor | Poor | Excellent | Excellent | Excellent | Excellent |

TABLE 4

|  | Example A13 | Example A14 | Example A15 | Example A16 |
|---|---|---|---|---|
| Initiator | Boron trifluoride dibutyl ether | | | |
| Ratio of initiator to monomer [Cat]/[M] (mol/mol) | $2.6 \times 10^{-4}$ | | | |
| Comonomer component | Contained | | | |
| Additive | Not contained | Not contained | Not contained | Not contained |
| Polymerization temperature (° C.) | 25 | 40 | 50 | 60 |
| Polymerization time (min) | 30 | 30 | 30 | 30 |
| Molecular weight distribution (—) | Single-peaked | Single-peaked | Single-peaked | Single-peaked |
| Peak top position logM (—) | 5.5 | 5.7 | 5.5 | 5.6 |
| Content of low molecular weight component (%) | 6.1 | 5.8 | 6.0 | 6.5 |
| Number average molecular weight Mn (—) | 32,360 | 34,473 | 33,979 | 29,628 |
| (the lower row indicates two significant figures) | ($3.2 \times 10^4$) | ($3.4 \times 10^4$) | ($3.4 \times 10^4$) | ($3.5 \times 10^4$) |
| Weight average molecular weight Mw (—) | 666,493 | 556,645 | 513,190 | 460,985 |
| (the lower row indicates two significant figures) | ($6.7 \times 10^5$) | ($5.6 \times 10^5$) | ($5.1 \times 10^5$) | ($6.5 \times 10^5$) |
| Boron atom content of polymer (mass ppm) | 0.67 | 0.66 | 0.66 | 0.64 |
| Thermogravimetric reduction rate (mass %) | 6 | 7 | 6 | 6 |
| Impact strength with notch (—) | Good | Good | Good | Good |

TABLE 5

|  | Example A17 | Example A18 | Example A19 | Example A20 | Example A21 | Example Z |
|---|---|---|---|---|---|---|
| Initiator | Boron trifluoride dibutyl ether | | | | | — |
| Ratio of initiator to monomer [Cat]/[M] (mol/mol) | $2.6 \times 10^{-4}$ | | | | | — |
| Comonomer component |  |  | Not contained | | | Not contained |
| Additive | Not contained | Not contained | Not contained | Not contained | Not contained | Not contained |
| Polymerization temperature (° C.) | 25 | 25 | 40 | 50 | 60 | 50 |
| Polymerization time (min) | 180 | 30 | 30 | 30 | 30 | 1440 |
| Molecular weight distribution (—) | Single-peaked | Single-peaked | Single-peaked | Single-peaked | Single-peaked | Single-peaked |
| Peak top position logM (—) | 5.2 | 5.9 | 5.7 | 5.4 | 5.6 | 5.9 |
| Content of low molecular weight component (%) | 0.0 | 4.3 | 3.9 | 2.7 | 3.4 | 4.8 |
| Number average molecular weight Mn (—) | 58,595 | 38,070 | 40,557 | 39,975 | 41,012 | 34,857 |
| (the lower row indicates two significant figures) | ($5.9 \times 10^4$) | ($3.8 \times 10^4$) | ($4.1 \times 10^4$) | ($4.0 \times 10^4$) | ($4.1 \times 10^4$) | ($3.5 \times 10^4$) |
| Weight average molecular weight Mw (—) | 297,022 | 757,378 | 632,551 | 583,171 | 737,809 | 523,847 |
| (the lower row indicates two significant figures) | ($3.0 \times 10^5$) | ($7.6 \times 10^5$) | ($6.3 \times 10^5$) | ($5.8 \times 10^5$) | ($7.4 \times 10^5$) | ($5.2 \times 10^5$) |
| Boron atom content of polymer (mass ppm) | 0.66 | 0.67 | 0.64 | 0.66 | 0.66 | Not detected |
| Thermogravimetric reduction rate (mass %) | 9 | 12 | 11 | 10 | 11 | 13 |
| Impact strength with notch (—) | Excellent | Excellent | Excellent | Excellent | Excellent | Excellent |

Example B and Comparative Example B

The analysis method and evaluation method used in Examples B and Comparative Examples B are as follows.

[Measurement of Boron Atom Content]

The boron atom content was measured and evaluated with the same method as in Examples A and Comparative Examples A described above.

[Measurement of Tungsten Atom Content]

Approximately 0.1 g of the polyoxymethylene sample obtained in Examples and Comparative Examples was precisely weighed in a decomposition container manufactured by TFM, sulfuric acid and nitric acid were added, and pressurized acid decomposition was performed with a microwave decomposition apparatus. The obtained decomposition solution was adjusted to a constant volume of 50 mL and subjected to ICP-MS measurement. An apparatus manufactured by Agilent Technologies (Agilent 7900) was used in the ICP-MS measurement.

[Measurement of Molybdenum Atom Content]

Measurement and evaluation were performed in the same manner as the measurement of the tungsten atom content described above.

[Measurement of Vanadium Atom Content]

Measurement and evaluation were performed in the same manner as the measurement of the tungsten atom content described above.

[Measurement of Fluorine Atom Content]

Approximately 80 mg of the polyoxymethylene sample obtained in Examples and Comparative Examples was burned with a combustion method in a combustion tube, and the generated gas was absorbed by an absorbing solution, adjusted to a constant volume of 10 mL, and subjected to IC measurement. Ultrapure water containing hydrogen peroxide solution and hydrazine hydrate was used as the absorbing solution. An apparatus manufactured by Thermo Fisher Scientific K.K. (Integrion RFIC) was used in the IC measurement.

[Measurement of Chlorine Atom Content]

Measurement and evaluation were performed in the same manner as the measurement of the fluorine atom content described above.

[Measurement of Sulfur Atom Content]

Approximately 50 mg of the polyoxymethylene sample obtained in Examples and Comparative Examples was burned with an automatic combustion method, and the generated gas was absorbed by an absorbing solution and subjected to IC measurement. A hydrogen peroxide solution and tartaric acid were used as the absorbing solution. An apparatus manufactured by Thermo Fisher Scientific K.K. (ICS-1500) was used in the IC measurement.

[Measurement of Molecular Weight Distribution]

The Mn, Mw, and molecular weight distribution of the polyoxymethylene obtained in Examples and Comparative Examples were measured using a GPC apparatus (HPLC8320) manufactured by Tosoh Corporation, where hexafluoroisopropanol in which 0.4 mass % of sodium trifluoroacetate had been dissolved was used as an eluent. PMMA was used as a standard substance.

The ratio (%) of the low molecular weight component was calculated by assuming that a peak of normal distribution with a width of 0.3 was at a position of log M=4.14 in the molecular weight distribution, taking a part where log M=3.0 to 3.7 from the bottom on the low molecular weight side as a peak top of the low molecular weight component, and performing peak fitting with a Gaussian distribution.

[Melting Point of First Scan]

The melting point of first scan of the polyoxymethylene obtained in Examples and Comparative Examples was measured by collecting a sample of 5 mg in an aluminum pan and then performing measurement with a program of raising the temperature from 30° C. to 200° C. at a heating rate of 20° C./min in a nitrogen atmosphere using a DSC apparatus (DSC3500) manufactured by NETZSCH. The melting point (° C.) of first scan is a temperature of peak top of the melting point peak that is first detected when measurement of a sample, which has not been subjected to any special heat treatment after polymerization, is started under the above heating conditions.

[Crystal Domain Size]

A sample of the polyoxymethylene obtained in Examples and Comparative Examples was embedded in epoxy resin and then a section having a thickness of 2 μm was prepared with a microtome. The section was observed under a polarizing microscope (main body LEITZ DMRP, camera LEICA DFC450C), and the major axis of an observed atypical domain was measured to determine the crystal domain size (μm).

In a state where the vibration directions of a polarizing plate inserted on a condenser side of the polarizing microscope (polarizer) and a polarizing plate inserted on an objective lens side of the polarizing microscope (analyzer) were orthogonal to each other and a sensitive color plate having an optical path difference of 530 nm was inserted in the optical path of the polarizing microscope, the "atypical domain" was a domain in which the interference color was observed in yellow or a domain in which the interference color was observed in blue (where the double refraction was in a range of 0 to 0.06).

The "major axis" of the "atypical domain" was taken as the crystal domain size (μm) of the "atypical domain".

The measurement of crystal domain size (μm) was performed on 20 samples, and an average value was taken as the crystal domain size (μm) of the polyoxymethylene.

FIG. 1 is a photograph of crystal of the polyoxymethylene of Example B2 of the present disclosure when it is observed under a polarizing microscope as described in the [Crystal domain size] described later. The arrows in the figure indicate the major axis of an atypical domain of the crystal of the polyoxymethylene.

Figure 2:
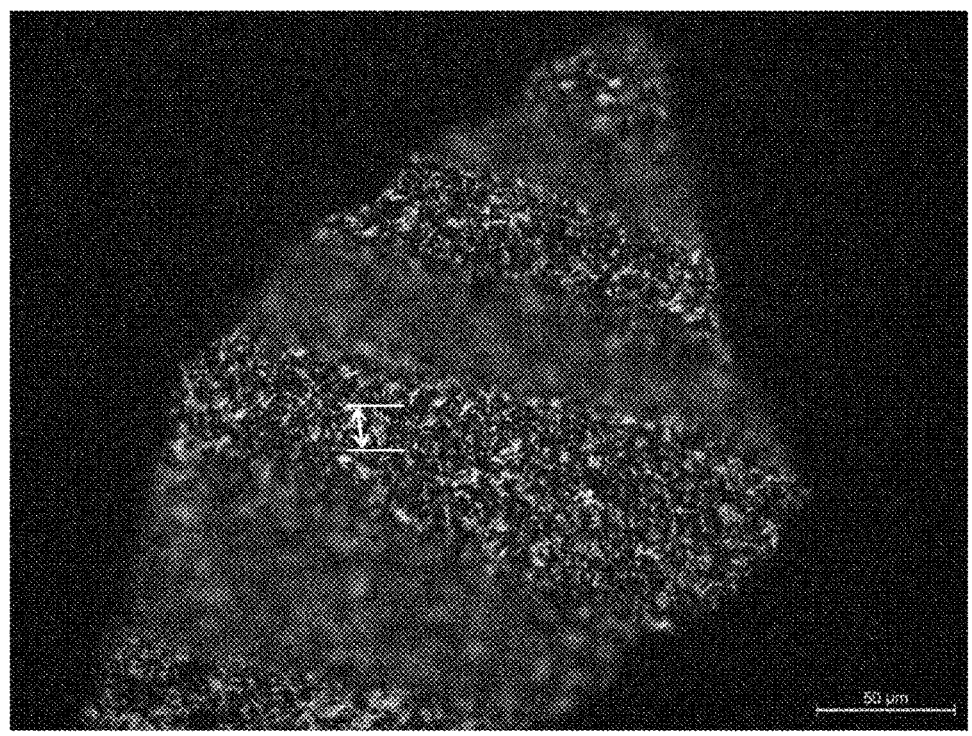
FIG. 2 is a photograph of crystal of the polyoxymethylene of Comparative Example B2 when it is observed under a polarizing microscope as described in the [Crystal domain size] described later. The arrows in the figure indicate the major axis of an atypical domain of the crystal of the polyoxymethylene.

FIG. 2 is a photograph of crystal of the polyoxymethylene of Comparative Example B2 when it is observed under a polarizing microscope as described in the [Crystal domain size] described later. The arrows in the figure indicate the major axis of an atypical domain of the crystal of the polyoxymethylene.

[Charpy Impact Strength (with Notch)]

The Charpy impact strength (with notch) was measured and evaluated with the same method as in Examples A and Comparative Examples A described above.

Example B1

First, 2 g of 1,3,5-trioxane (melting point: 64° C., boiling point: 114.5° C.) was weighed and put into a fluororesin test tube having a diameter of 16 mm together with a stirrer, and a septum cap was covered. The test tube was fixed in an oil bath that had been heated to 90° C. to melt the 1,3,5-trioxane, and then 60 μL of 1,3-dioxolane was added as a comonomer component. Next, 50 μL of a boron trifluoride dibutyl ether solution prepared with cyclohexane at 0.12 mol/mL was added, and immediately after that, the test tube was moved to a beaker (4° C.) containing ice water to continue the polymerization reaction. After 15 minutes, the septum cap was removed, and 1 mL of a 20% triethylamine/ethanol solution and 2.5 mL of acetone were added respectively to terminate the polymerization. The obtained polymer was crushed and taken out, washed, then filtered, and vacuum dried at 25° C. for 2 hours. As a result, about 2 g of polyoxymethylene of Example B1 was obtained. The obtained polymer was subjected to each of the above evaluations. The weight average molecular weight of the obtained polyoxymethylene was 1,057,891. Table 6 summarizes the results. The boron atom content in the obtained polyoxymethylene was 0.6 mass ppm.

Example B2

First, 2 g of 1,3,5-trioxane (melting point: 64° C., boiling point: 114.5° C.) was weighed and put into a fluororesin test tube having a diameter of 16 mm together with a stirrer, and a septum cap was covered. The test tube was fixed in an oil bath that had been heated to 90° C. to melt the 1,3,5-trioxane. Next, 50 μL of a boron trifluoride dibutyl ether solution prepared with cyclohexane at 0.12 mol/mL was added, and immediately after that, the test tube was moved to a beaker (4° C.) containing ice water to continue the polymerization reaction. After 15 minutes, the septum cap was removed, and 1 mL of a 20% triethylamine/ethanol solution and 2.5 mL of acetone were added respectively to terminate the polymerization. The obtained polymer was crushed and taken out, washed, then filtered, and vacuum dried at 25° C. for 2 hours. As a result, about 2 g of polyoxymethylene of Example B2 was obtained. The obtained polymer was subjected to each of the above evaluations. The weight average molecular weight of the obtained polyoxymethylene was 1,101,779. Table 1 summarizes the results. The boron atom content in the obtained polyoxymethylene was 0.67 mass ppm.

Example B3

Example B3 was performed in the same manner as in Example B2 except that the temperature was adjusted to −20° C. using a mixture of ice and sodium chloride instead of the ice water. The boron atom content in the obtained polyoxymethylene was 0.6 mass ppm.

Example B4

Example B4 was performed in the same manner as in Example B2 except that the temperature was adjusted to −78° C. using a mixture of ethanol and dry ice instead of the ice water. The boron atom content in the obtained polyoxymethylene was 0.7 mass ppm.

Example B5

First, 2 g of 1,3,5-trioxane (melting point: 64° C., boiling point: 114.5° C.) was weighed and put into a fluororesin test tube having a diameter of 16 mm together with a stirrer, and a septum cap was covered. The test tube was fixed in an oil bath that had been heated to 90° C. to melt the 1,3,5-trioxane. Next, 50 µL of a boron trifluoride dibutyl ether solution prepared with cyclohexane at 0.12 mol/mL was added, and immediately after that, the test tube was moved to a beaker containing ice water to continue the polymerization reaction. After 15 minutes, the test tube was moved to an oil bath kept at 140° C., and the polymerization reaction was continued for another 3 minutes. Then, the septum cap was removed, and 1 mL of a 20% triethylamine/ethanol solution and 2.5 mL of acetone were added respectively to terminate the polymerization. The obtained polymer was crushed and taken out, washed, then filtered, and vacuum dried at 25° C. for 2 hours. As a result, about 2 g of polyoxymethylene of Example B5 was obtained. The obtained polymer was subjected to each of the above evaluations. The weight average molecular weight of the obtained polyoxymethylene was 689,433. Table 1 summarizes the results. The boron atom content in the obtained polyoxymethylene was 0.6 mass ppm.

Example B6

Example B6 was performed in the same manner as in Example B2 except that 100 µL of a phosphotungstic acid 27 hydrate solution prepared with dimethyl adipate at $4.4 \times 10^4$ mmol/mL was added as an initiator instead of the boron trifluoride dibutyl ether solution. The tungsten atom content in the obtained polyoxymethylene was 2.0 mass ppm.

Example B7

Example B7 was performed in the same manner as in Example B2 except that 30 µL of a phosphomolybdic acid solution prepared with dimethyl adipate at 0.03 mass % was added as an initiator instead of the boron trifluoride dibutyl ether solution. The molybdenum atom content in the obtained polyoxymethylene was 0.5 mass ppm.

Example B8

Example B8 was performed in the same manner as in Example B2 except that 100 µL of a trifluoromethanesulfonic acid solution prepared with 1,4-dioxane at $1 \times 10^{-3}$ mmol/mL was added as an initiator instead of the boron trifluoride dibutyl ether solution. In the obtained polyoxymethylene, the fluorine atom content was 10 mass ppm, and the sulfur atom content was 0.7 mass ppm.

Example B9

Example B9 was performed in the same manner as in Example B2 except that 50 µL of a tin tetrachloride solution prepared with cyclohexane at 0.12 mol/mL was added as an initiator instead of the boron trifluoride dibutyl ether solution. The chlorine atom content in the obtained polyoxymethylene was 12 mass ppm.

Comparative Example B1

Polymerization was performed in the same manner as in Example B1 except that the polymerization was continued in the oil bath at 90° C. without moving to ice water (the polymerization temperature was set to 90° C.).

Comparative Example B2

Polymerization was performed in the same manner as in Example B2 except that the polymerization was continued in the oil bath at 90° C. without moving to ice water (the polymerization temperature was set to 90° C.).

Comparative Example B3

Comparative Example B3 was performed in the same manner as in Example B2 except that tap water was used instead of the ice water and the temperature was adjusted to 25° C. (the polymerization temperature was set to 25° C.).

TABLE 6

| | | Example B1 | Example B2 | Example B3 | Example B4 | Example B5 | Example B6 |
|---|---|---|---|---|---|---|---|
| Polyacetal | — | — | Copolymer | Homopolymer | Homopolymer | Homopolymer | Homopolymer | Homopolymer |
| Polymerization time | min | — | 15 | 15 | 15 | 15 | 18 | 15 |
| Polymerization temperature | ° C. | — | 4 | 4 | −20 | −78 | 4 ⇒ 140 | 4 |
| Weight average molecular weight Mw | — | — | 1,057,891 | 1,101,779 | 1,204,958 | 1,517,998 | 689,433 | 1,005,837 |
| (the lower row indicates two significant figures) | — | — | ($1.1 \times 10^6$) | ($1.1 \times 10^6$) | ($1.2 \times 10^6$) | ($1.5 \times 10^6$) | ($6.9 \times 10^5$) | ($1.0 \times 10^6$) |
| Number average molecular weight Mn | — | — | 41,329 | 37,717 | 34,954 | 50,578 | 45,876 | 53,378 |
| (the lower row indicates two significant figures) | — | — | ($4.1 \times 10^4$) | ($3.8 \times 10^4$) | ($3.5 \times 10^4$) | ($5.1 \times 10^4$) | ($4.6 \times 10^4$) | ($5.3 \times 10^4$) |
| Mw/Mn | — | — | 26 | 29 | 34 | 30 | 15 | 19 |
| Position of peak on high molecular region side (logM) | — | — | 5.7 | 5.8 | 6.2 | 7.0 | 5.6 | 5.7 |
| Content of low molecular weight component | % | — | 4.8 | 5.3 | 4.7 | 4.3 | 4.6 | 3.0 |
| Melting point of first scan | ° C. | — | 186 | 188 | 189 | 189 | 188 | 189 |
| Crystal domain size | µm | — | 169 | 246 | 263 | 338 | 252 | 255 |
| Impact strength with notch | kJ/m² | — | Excellent | Excellent | Excellent | Excellent | Excellent | Excellent |

| | | Example B7 | Example B8 | Example B9 | Comparative Example B1 | Comparative Example B2 | Comparative Example B3 |
|---|---|---|---|---|---|---|---|
| Polyacetal | — | Homopolymer | Homopolymer | Homopolymer | Copolymer | Homopolymer | Homopolymer |
| Polymerization time | min | 15 | 15 | 15 | 15 | 15 | 15 |
| Polymerization temperature | ° C. | 4 | 4 | 4 | 90 | 90 | 25 |
| Weight average molecular weight Mw | — | 1,021,459 | 1,071,775 | 1,041,750 | 142,080 | 161,454 | 208,987 |
| (the lower row indicates two significant figures) | — | ($1.0 \times 10^6$) | ($1.1 \times 10^6$) | ($1.0 \times 10^6$) | ($1.4 \times 10^5$) | ($1.6 \times 10^5$) | ($2.1 \times 10^5$) |
| Number average molecular weight Mn | — | 48,596 | 42,395 | 38,924 | 25,648 | 29,145 | 21,560 |
| (the lower row indicates two significant figures) | — | ($4.9 \times 10^4$) | ($4.2 \times 10^4$) | ($3.9 \times 10^4$) | ($2.6 \times 10^4$) | ($2.9 \times 10^4$) | ($2.2 \times 10^4$) |
| Mw/Mn | — | 21 | 25 | 27 | 6 | 6 | 10 |
| Position of peak on high molecular region side (logM) | — | 5.6 | 5.7 | 5.7 | 4.7 | 4.9 | 4.9 |

TABLE 6-continued

| Content of low molecular weight component | % | 4.3 | 4.5 | 5.1 | 6.9 | 6.5 | 10.7 |
|---|---|---|---|---|---|---|---|
| Melting point of first scan | ° C. | 188 | 187 | 188 | 180 | 183 | 182 |
| Crystal domain size | μm | 240 | 232 | 244 | 15 | 16 | 16 |
| Impact strength with notch | kJ/m² | Excellent | Excellent | Excellent | Good | Good | Poor |

As indicated by Table 6, it can be understood that the mechanical strength of Examples B1 to B9 having a weight average molecular weight (Mw) of 650,000 or more is dramatically improved.

Example C and Comparative Example C

The analysis method and evaluation method used in Examples C and Comparative Examples C are as follows.
[Measurement of Weight Average Molecular Weight, Number Average Molecular Weight, and Molecular Weight Distribution]
The Mn, Mw, and molecular weight distribution were measured with the same method as in Examples A and Comparative Examples A described above.
[Measurement of Content of Low Molecular Weight Component]
The content of the low molecular weight component was measured with the same method as in Examples A and Comparative Examples A described above.
[Thermogravimetry]
Thermogravimetry was performed with the same method as in Examples A and Comparative Examples A described above. Evaluation was performed according to the following evaluation criteria.
Excellent: less than 15 mass %, good: 15 mass % or more and less than 25 mass %, practicable: 25 mass % or more and less than 30 mass %, and poor: 30 mass % or more.
[Charpy Impact Strength (with Notch)]
The Charpy impact strength (with notch) was measured and evaluated with the same method as in Examples A and Comparative Examples A described above.

Example C1

<Initiator Support>
First, 38 mg of mesoporous silica MCM41 sold by Sigma-Aldrich Japan was weighed and mixed with 5 mL of cyclohexane and dispersed, 5 mL of a boron trifluoride dibutyl ether solution prepared with cyclohexane at 0.19 mmol/mL was added, and the mixture was stirred, allowed to stand for 3 hours or longer and then filtered. Next, 20 mg of the filtered material was weighed and mixed with 5 mL of cyclohexane and dispersed to prepare a 4 mg/mL mesoporous silica-supported boron trifluoride dibutyl ether/cyclohexane dispersion. All operations were performed in a nitrogen atmosphere.
<Polymerization>
First, 2 g of 1,3,5-trioxane (melting point: 64° C., boiling point: 114.5° C.) was weighed and put into a fluororesin test tube having a diameter of 16 mm together with a stirrer, and a septum cap was covered. The test tube was fixed in an oil bath that had been heated to 90° C. to melt the 1,3,5-trioxane, then 60 μL of 1,3-dioxolane was added as a comonomer component, and 100 μL of the mesoporous silica-supported boron trifluoride dibutyl ether/cyclohexane dispersion was added to initiate polymerization. After 15 minutes, the test tube was taken out from the oil bath and immersed in ice water, the septum cap was removed, and 1 mL of a 20% triethylamine/ethanol solution and 2.5 mL of acetone were added respectively to terminate the polymerization. The obtained polymer was crushed and taken out, washed, then filtered, and vacuum dried at 25° C. for 2 hours. As a result, about 2 g of polyoxymethylene was obtained.

Example C2

<Synthesis of Spherical Core-Shell Type Mesoporous Silica>
Silica particles SS-10 manufactured by Tokuyama Corporation were prepared as core particles. Then, 4.81 g of the silica core particles, 6.8 mL of ammonia water, 22 mL of distilled water, and 10 mL of ethanol were added to a 100 mL flask with a lid, and the flask was immersed in an oil bath that had been heated to 90° C. and stirred for 3 hours to obtain a dispersion. Next, 0.73 g of dodecyl amine as a surfactant and 28.8 g of distilled water were added, and ethanol was added so that the total volume of the dispersion was 80 mL, and then these materials were sufficiently mixed to prepare a mixed dispersion. Then, while stirring the mixed dispersion under the condition of 25° C., 0.17 g of tetraethoxysilane as a silica raw material was added to the mixed dispersion. The reaction solution was continuously stirred for 20 hours to hydrolyze the tetraethoxysilane to form a shell precursor on the surface of the silica core particles.
The reaction solution was filtered using a membrane filter having a pore size of 0.1 μm, and a core-shell type mesoporous silica precursor was recovered. The core-shell type mesoporous silica precursor was dispersed in 50 mL of ethanol and stirred at 70° C. for one hour to dissolve and remove a part of the dodecyl amine. The dispersion was filtered using a membrane filter having a pore size of 0.1 μm, and a core-shell type mesoporous silica precursor was recovered. The core-shell type mesoporous silica precursor was calcined at 550° C. for 3 hours to completely remove the dodecyl amine. Then, it was heated in an electric furnace at 800° C. for 3 hours to obtain spherical core-shell type mesoporous silica (average pore size: 1.4 nm) for supporting a polymerization catalyst.
<Initiator Support>
It was performed in the same manner as in Example C1 except that the above-described spherical core-shell type mesoporous silica was used instead of the MCM-41.
<Polymerization>
It was performed in the same manner as in Example C1 except that a boron trifluoride dibutyl ether/cyclohexane dispersion supported by the above-described spherical core-shell type mesoporous silica instead of the MCM-41 was used.

Example C3

<Synthesis of Spherical Core-Shell Type Mesoporous Silica>
Silica particles SS-10 manufactured by Tokuyama Corporation were prepared as core particles. Then, 4.81 g of the silica core particles, 6.8 mL of ammonia water, 22 mL of distilled water, and 10 mL of ethanol were added to a 100 mL flask with a lid, and the flask was immersed in an oil bath that had been heated to 90° C. and stirred for 3 hours to obtain a dispersion. Next, 0.73 g of dodecyl amine as a surfactant and 28.8 g of distilled water were added, and ethanol was added so that the total volume of the dispersion was 80 mL, and then these materials were sufficiently mixed to prepare a mixed dispersion. Then, while stirring the mixed dispersion under the condition of 25° C., 0.17 g of tetraethoxysilane as a silica raw material was added to the mixed dispersion. The reaction solution was continuously stirred for 20 hours to hydrolyze the tetraethoxysilane to form a shell precursor on the surface of the silica core particles.

The reaction solution was filtered using a membrane filter having a pore size of 0.1 μm, and a core-shell type mesoporous silica precursor was recovered. The core-shell type mesoporous silica precursor was dispersed in 50 mL of ethanol and stirred at 70° C. for one hour to dissolve and remove a part of the dodecyl amine. The dispersion was filtered using a membrane filter having a pore size of 0.1 μm, and a core-shell type mesoporous silica precursor was recovered. The core-shell type mesoporous silica precursor was calcined at 550° C. for 3 hours to completely remove the dodecyl amine, and spherical core-shell type mesoporous silica (average pore size: 2.6 nm) for supporting a polymerization catalyst was obtained.

<Initiator Support>

It was performed in the same manner as in Example C1 except that the above-described spherical core-shell type mesoporous silica was used instead of the MCM-41.

<Polymerization>

It was performed in the same manner as in Example C1 except that a boron trifluoride dibutyl ether/cyclohexane dispersion supported by the above-described spherical core-shell type mesoporous silica instead of the MCM-41 was used.

Example C4

<Initiator Support>

It was performed in the same manner as in Example C1 except that mesoporous silica SBA-15 (pore size 4.0 nm grade) sold by Sigma-Aldrich Japan K.K. was used instead of the MCM-41.

<Polymerization>

It was performed in the same manner as in Example C1 except that a boron trifluoride dibutyl ether/cyclohexane dispersion supported by the above-described mesoporous silica SBA-15 (pore size 4.0 nm grade) sold by Sigma-Aldrich Japan K.K. instead of the MCM-41 was used.

Comparative Example C1

Polymerization was performed in the same manner as in Example C1 except that the initiator was not supported by mesoporous silica and that a boron trifluoride dibutyl ether solution prepared with cyclohexane at 0.0026 mol/mL was used for polymerization.

Comparative Example C2

Comparative Example C2 was performed in the same manner as in Example C1 except that mesoporous silica SBA-15 (pore size 6.0 nm grade) sold by Sigma-Aldrich Japan K.K. was used instead of the MCM-41.

Comparative Example C3

Comparative Example C3 was performed in the same manner as in Example C1 except that silica particles SS-10 manufactured by Tokuyama Corporation were used instead of the MCM-41.

TABLE 7

| | Example C1 | Example C2 | Example C3 | Example C4 | Comparative Example C1 | Comparative Example C2 | Comparative Example C3 |
|---|---|---|---|---|---|---|---|
| Initiator | Boron trifluoride dibutyl ether | | | | Boron trifluoride dibutyl ether | | |
| Ratio of mesoporous silica to monomer [MPS]/[M] (g/mol) | $1.73 \times 10^{-2}$ | | | | $2.6 \times 10^{-4}$ (*1) | $1.73 \times 10^{-2}$ | $1.73 \times 10^{-2}$ (*2) |
| Ratio of mesoporous silica to initiator [MPS]/[Cat] (g/mol) | 40 | 40 | 40 | 40 | 40 | 40 | 40 |
| Comonomer component | Contained | | | | Not used | Contained | |
| Type of mesoporous silica | MCM-41 | Spherical core-shell type | Spherical core-shell type | SBA-15-4 nm | Not used | SBA-15-6 nm | (Spherical silica) SS-10 |
| Average pore size of pores of mesoporous silica (nm) | 2.9 | 1.4 | 2.6 | 4.0 | — | 6.0 | (No pore) |
| Average thickness of pore walls of mesoporous silica (nm) | 0.9 | 0.7 | 1.5 | 1.9 | — | 2.9 | — |
| Molecular weight distribution (—) | Single-peaked | Single-peaked | Single-peaked | Single-peaked | Double-peaked | Double-peaked | Double-peaked |
| Content of low molecular weight component (%) | 6.0% | 5.6% | 5.4% | 5.2% | 14.0% | 18.0% | 16.0% |
| Number average molecular weight Mn (—) (the lower row indicates two significant figures) | 31,024 ($3.1 \times 10^4$) | 33,074 ($3.3 \times 10^4$) | 36,837 ($3.7 \times 10^4$) | 38,948 ($3.9 \times 10^4$) | 22,083 ($2.2 \times 10^4$) | 19,387 ($1.9 \times 10^4$) | 20,948 ($2.1 \times 10^4$) |
| Weight average molecular weight Mw (—) (the lower row indicates two significant figures) | 160,932 ($1.6 \times 10^5$) | 220,394 ($2.2 \times 10^5$) | 203,957 ($2.0 \times 10^5$) | 210,485 ($2.1 \times 10^5$) | 174,857 ($1.7 \times 10^5$) | 252,031 ($2.5 \times 10^5$) | 293,272 ($2.9 \times 10^5$) |
| Thermogravimetric reduction rate (—(mass %)) | Excellent (6) | Excellent (8) | Excellent (6) | Excellent (10) | Excellent (12) | Excellent (13) | Excellent (12) |
| Impact strength with notch (—) | Good | Good | Good | Good | Poor | Poor | Poor |

(*1) In Comparative Example 1, it is a ratio of initiator to monomer [Cat]/[M] (mol/mol)
(*2) In Comparative Example 3, it is a ratio of silica to monomer [Silica]/[M] (g/mol)

Example D and Comparative Example D

The analysis method and evaluation method used in Examples D and Comparative Examples D are as follows.
[Measurement of Weight Average Molecular Weight, Number Average Molecular Weight, and Molecular Weight Distribution]
The Mn, Mw, and molecular weight distribution were measured with the same method as in Examples A and Comparative Examples A described above.
[Measurement of Content of Low Molecular Weight Component]
The content of the low molecular weight component was measured with the same method as in Examples A and Comparative Examples A described above.
[Measurement of Boron Atom Content]
The boron atom content was measured with the same method as in Examples A and Comparative Examples A described above.
[Thermogravimetry]
Thermogravimetry was performed and evaluated with the same method as in Examples C and Comparative Examples C described above.
[Charpy Impact Strength (with Notch)]
The Charpy impact strength (with notch) was measured and evaluated with the same method as in Examples A and Comparative Examples A described above.

Example D1

First, 2 g of 1,3,5-trioxane (melting point: 64° C., boiling point: 114.5° C.) was weighed and put into a fluororesin test tube having a diameter of 16 mm together with a stirrer, then 50 μL of butyl acetate was added, and a septum cap was covered. The test tube was fixed in an oil bath that had been heated to 90° C. to melt the 1,3,5-trioxane, then 60 μL of 1,3-dioxolane was added as a comonomer component, and 100 μL of a boron trifluoride dibutyl ether solution prepared with cyclohexane at 0.06 mmol/mL was added to initiate polymerization. After 15 minutes, the test tube was taken out from the oil bath and immersed in ice water, the septum cap was removed, and 1 mL of a 20% triethylamine/ethanol solution and 2.5 mL of acetone were added respectively to terminate the polymerization. The obtained polymer was crushed and taken out, washed, then filtered, and vacuum dried at 25° C. for 2 hours. As a result, about 2 g of polyoxymethylene was obtained.
The ratio of the low molecular weight component of the polymer was 4.5%, and the thermogravimetric reduction rate was 8%.

Example D2

Example D2 was performed in the same manner as in Example D1 except that 50 μL of ethyl acetate was added instead of the butyl acetate.

Examples D3 to D8, D10 to D19, D20 to D27, and D29 to D38

Examples D3 to D8 and D10 to D19 were performed in the same manner as in Example D1 except that the type of the Lewis base and the amount of the Lewis base added were changed. Further, Examples D20 to D27 and D29 to D38 were performed in the same manner as in Example D1 except that the 1,3-dioxolane, which was a comonomer component, was not added.

Examples D9 and D28

Example D9 was performed in the same manner as in Example D1 except that a boron trifluoride diethyl ether solution which was prepared with cyclohexane at 0.06 mmol/mL after adding azelaic acid bis(2-ethylhexyl) in the same amount of substance as the boron trifluoride diethyl ether was used as an initiator solution.
Example D28 was performed in the same manner as in Example D1 except that the 1,3-dioxolane, which was a comonomer component, was not added, and that a boron trifluoride diethyl ether solution which was prepared with cyclohexane at 0.06 mmol/mL after adding azelaic acid bis(2-ethylhexyl) in the same amount of substance as the boron trifluoride diethyl ether was used as an initiator solution.

Comparative Example D1

Polymerization was performed in the same manner as in Example D1 except that the butyl acetate was not added.

Comparative Example D2

Polymerization was performed in the same manner as in Comparative Example D1 except that the 1,3-dioxolane, which was a comonomer component, was not added.

Comparative Example D3

First, 2 g of 1,3,5-trioxane (melting point: 64° C., boiling point: 114.5° C.) was weighed and put into a fluororesin test tube having a diameter of 16 mm together with a stirrer, and a septum cap was covered. The test tube was fixed in an oil bath that had been heated to 90° C. to melt the 1,3,5-trioxane, then 60 μL of 1,3-dioxolane was added as a comonomer component, and 100 μL of a phosphotungstic acid 27 hydrate solution prepared with dimethyl adipate at $4.4 \times 10^{-4}$ mmol/mL was added to initiate polymerization. After 15 minutes, the test tube was taken out from the oil bath and immersed in ice water, the septum cap was removed, and 1 mL of a 20% triethylamine/ethanol solution and 2.5 mL of acetone were added respectively to terminate the polymerization. The obtained polymer was crushed and taken out, washed, then filtered, and vacuum dried at 25° C. for 2 hours. As a result, about 2 g of polyoxymethylene was obtained.

Comparative Example D4

Polymerization was performed in the same manner as in Comparative Example D3 except that the 1,3-dioxolane, which was a comonomer component, was not added.

Comparative Example D5

First, 2 g of 1,3,5-trioxane (melting point: 64° C., boiling point: 114.5° C.) was weighed and put into a fluororesin test tube having a diameter of 16 mm together with a stirrer, and a septum cap was covered. The test tube was fixed in an oil bath that had been heated to 90° C. to melt the 1,3,5-trioxane, then 60 μL of 1,3-dioxolane was added as a comonomer component, and 100 μL of a trifluoromethanesulfonic acid solution prepared with 1,4-dioxane at $1 \times 10^{-3}$ mmol/mL was added to initiate polymerization. After 15 minutes, the test tube was taken out from the oil bath and immersed in ice water, the septum cap was removed, and 1 mL of a 20% triethylamine/ethanol solution and 2.5 mL of acetone were added respectively to terminate the polymerization. The obtained polymer was crushed and taken out, washed, then filtered, and vacuum dried at 25° C. for 2 hours. As a result, about 2 g of polyoxymethylene was obtained.

Comparative Example D6

Polymerization was performed in the same manner as in Comparative Example D5 except that the 1,3-dioxolane, which was a comonomer component, was not added.

Tables 8 to 14 summarize the polymerization conditions and results of each Example and Comparative Example.

Regarding the evaluation results of the thermogravimetric reduction rate, the numerical values of the weight reduction rate (mass %) of some Examples and Comparative Examples are also listed.

TABLE 8

|  | Example D1 | Example D2 | Example D3 | Example D4 | Example D5 |
|---|---|---|---|---|---|
| Initiator | Boron trifluoride dibutyl ether | | | | |
| Ratio of initiator to monomer [Cat]/[M] (mol/mol) | $2.6 \times 10^{-4}$ | | | | |
| Comonomer component | Contained | | | | |
| Lewis base additive | Butyl acetate | Ethyl acetate | Amyl hexylate | Methyl butyrate | Octyl butyrate |
| Ratio of Lewis base to initiator [Base]/[Cat] (mol/mol) | 63 | 85 | 39 | 73 | 36 |
| Molecular weight distribution (—) | Single-peaked | Single-peaked | Single-peaked | Single-peaked | Single-peaked |
| Content of low molecular weight component (%) | 4.5% | 6.5% | 6.2% | 5.6% | 6.0% |
| Number average molecular weight Mn (—) (the lower row indicates two significant figures) | 34,811 ($3.5 \times 10^4$) | 31,062 ($3.1 \times 10^4$) | 32,228 ($3.2 \times 10^4$) | 34,935 ($3.5 \times 10^4$) | 33,070 ($3.3 \times 10^4$) |
| Weight average molecular weight Mw (—) (the lower row indicates two significant figures) | 203,913 ($2.0 \times 10^5$) | 202,344 ($2.0 \times 10^5$) | 209,175 ($2.1 \times 10^5$) | 225,033 ($2.3 \times 10^5$) | 214,109 ($2.1 \times 10^5$) |
| Boron atom content of polymer (mass ppm) | 0.67 | 0.66 | 0.64 | 0.64 | 0.64 |
| Thermogravimetric reduction rate (—(mass %)) | Excellent (8) | Excellent (12) | Excellent (10) | Excellent | Excellent |
| Impact strength with notch (—) | Good | Good | Good | Good | Good |

|  | Example D6 | Example D7 | Example D8 | Example D9 |
|---|---|---|---|---|
| Initiator | Boron trifluoride dibutyl ether | | | Boron trifluoride diethyl ether |
| Ratio of initiator to monomer [Cat]/[M] (mol/mol) | $2.6 \times 10^{-4}$ | | | |
| Comonomer component | Contained | | | |
| Lewis base additive | Dimethyl azelate | Bis(2-ethylhexyl) azelate | Dimethyl malonate | Bis(2-ethylhexyl) azelate |
| Ratio of Lewis base to initiator [Base]/[Cat] (mol/mol) | 26 | 13 | 50 | 1 |
| Molecular weight distribution (—) | Single-peaked | Single-peaked | Single-peaked | Single-peaked |
| Content of low molecular weight component (%) | 5.0% | 4.3% | 5.0% | 4.5% |
| Number average molecular weight Mn (—) (the lower row indicates two significant figures) | 38,292 ($3.8 \times 10^4$) | 36,430 ($3.6 \times 10^4$) | 31,330 ($3.1 \times 10^4$) | 34,811 ($3.5 \times 10^4$) |
| Weight average molecular weight Mw (—) (the lower row indicates two significant figures) | 244,696 ($2.4 \times 10^5$) | 274,571 ($2.7 \times 10^5$) | 244,696 ($2.4 \times 10^5$) | 265,087 ($2.7 \times 10^5$) |
| Boron atom content of polymer (mass ppm) | 0.66 | 0.66 | 0.65 | 0.65 |
| Thermogravimetric reduction rate (—(mass %)) | Excellent | Excellent | Excellent | Excellent |
| Impact strength with notch (—) | Good | Good | Good | Good |

TABLE 9

|  | Example D10 | Example D11 | Example D12 | Example D13 | Example D14 | Example D15 | Example D16 |
|---|---|---|---|---|---|---|---|
| Initiator | Boron trifluoride dibutyl ether | | | | | | |
| Ratio of initiator to monomer [Cat]/[M] (mol/mol) | $2.6 \times 10^{-4}$ | | | | | | |
| Comonomer component | Contained | | | | | | |
| Lewis base additive | Diethyl sulfide | Dipropyl sulfide | Methyl propyl sulfide | Myristo-nitrile | Dihexyl sulfide | Phenyl-acetonitrile | Valer-onitrile |
| Ratio of Lewis base to initiator [Base]/[Cat] (mol/mol) | 16 | 12 | 16 | 7 | 3 | 7 | 8 |
| Molecular weight distribution (—) | Single-peaked | Single-peaked | Single-peaked | Single-peaked | Single-peaked | Single-peaked | Single-peaked |
| Content of low molecular weight component (%) | 5.4% | 5.7% | 4.3% | 6.0% | 5.9% | 6.2% | 5.8% |
| Number average molecular weight Mn (—) (the lower row indicates two significant figures) | 35,971 ($3.6 \times 10^4$) | 34,445 ($3.4 \times 10^4$) | 36,430 ($3.6 \times 10^4$) | 33,070 ($3.3 \times 10^4$) | 33,513 ($3.4 \times 10^4$) | 32,228 ($3.2 \times 10^4$) | 33,971 ($3.4 \times 10^4$) |
| Weight average molecular weight Mw (—) (the lower row indicates two significant figures) | 305,870 ($3.1 \times 10^5$) | 239,990 ($2.4 \times 10^5$) | 202,597 ($2.0 \times 10^5$) | 279,652 ($2.8 \times 10^5$) | 261,688 ($2.6 \times 10^5$) | 314,026 ($3.1 \times 10^5$) | 336,219 ($3.4 \times 10^5$) |

TABLE 9-continued

| | Example D10 | Example D11 | Example D12 | Example D13 | Example D14 | Example D15 | Example D16 |
|---|---|---|---|---|---|---|---|
| Boron atom content of polymer (mass ppm) | 0.67 | 0.66 | 0.64 | 0.64 | 0.65 | 0.66 | 0.64 |
| Thermogravimetric reduction rate (—(mass %)) | Excellent | Excellent | Excellent | Excellent | Excellent | Excellent | Excellent |
| Impact strength with notch (—) | Good | Good | Good | Good | Good | Good | Good |

TABLE 10

| | Example D17 | Example D18 | Example D19 |
|---|---|---|---|
| Initiator | Boron trifluoride dibutyl ether | | |
| Ratio of initiator to monomer [Cat]/[M] (mol/mol) | $2.6 \times 10^{-4}$ | | |
| Comonomer component | Contained | | |
| Lewis base additive | Trifluoroacetylacetone | 3-acetylbenzotrifluoride | Tetrahydro-2-methylfuran-3-one |
| Ratio of Lewis base to initiator [Base]/[Cat] (mol/mol) | 42 | 33 | 52 |
| Molecular weight distribution (—) | Single-peaked | Single-peaked | Single-peaked |
| Content of low molecular weight component (%) | 5.4% | 3.9% | 5.0% |
| Number average molecular weight Mn (—) | 35,971 | 50,730 | 38,292 |
| (the lower row indicates two significant figures) | ($3.6 \times 10^4$) | ($5.0 \times 10^4$) | ($3.8 \times 10^4$) |
| Weight average molecular weight Mw (—) | 285,478 | 263,702 | 225,620 |
| (the lower row indicates two significant figures) | ($2.9 \times 10^5$) | ($2.6 \times 10^5$) | ($2.3 \times 10^5$) |
| Boron atom content of polymer (mass ppm) | 0.67 | 0.66 | 0.64 |
| Thermogravimetric reduction rate (—(mass %)) | Excellent | Excellent | Excellent |
| Impact strength with notch (—) | Good | Good | Good |

TABLE 11

| | Example D20 | Example D21 | Example D22 | Example D23 | Example D24 |
|---|---|---|---|---|---|
| Initiator | Boron trifluoride dibutyl ether | | | | |
| Ratio of initiator to monomer [Cat]/[M] (mol/mol) | $2.6 \times 10^{-4}$ | | | | |
| Comonomer component | Not contained | | | | |
| Lewis base additive | Butyl acetate | Ethyl acetate | Amyl hexylate | Methyl butyrate | Octyl butyrate |
| Ratio of Lewis base to initiator [Base]/[Cat] (mol/mol) | 63 | 85 | 39 | 73 | 36 |
| Molecular weight distribution (—) | Single-peaked | Single-peaked | Single-peaked | Single-peaked | Single-peaked |
| Content of low molecular weight component (%) | 3.3% | 5.4% | 5.1% | 4.5% | 4.9% |
| Number average molecular weight Mn (—) | 40,243 | 32,642 | 34,088 | 37,560 | 35,151 |
| (the lower row indicates two significant figures) | ($4.0 \times 10^4$) | ($3.3 \times 10^4$) | ($3.4 \times 10^4$) | ($3.8 \times 10^4$) | ($3.5 \times 10^4$) |
| Weight average molecular weight Mw (—) | 208,456 | 189,927 | 197,420 | 215,405 | 202,926 |
| (the lower row indicates two significant figures) | ($2.1 \times 10^5$) | ($1.9 \times 10^5$) | ($2.0 \times 10^5$) | ($2.2 \times 10^5$) | ($2.0 \times 10^5$) |
| Boron atom content of polymer (mass ppm) | 0.64 | 0.64 | 0.64 | 0.68 | 0.69 |
| Thermogravimetric reduction rate (—(mass %)) | Good (18) | Good (20) | Good (21) | Good | Good |
| Impact strength with notch (—) | Excellent | Excellent | Excellent | Excellent | Excellent |

| | Example D25 | Example D26 | Example D27 | Example D28 |
|---|---|---|---|---|
| Initiator | Boron trifluoride dibutyl ether | | | Boron trifluoride diethyl ether |
| Ratio of initiator to monomer [Cat]/[M] (mol/mol) | $2.6 \times 10^{-4}$ | | | |
| Comonomer component | Not contained | | | |
| Lewis base additive | Dimethyl azelate | Bis(2-ethylhexyl) azelate | Dimethyl malonate | Bis(2-ethylhexyl) azelate |
| Ratio of Lewis base to initiator [Base]/[Cat] (mol/mol) | 26 | 13 | 50 | 1 |
| Molecular weight distribution (—) | Single-peaked | Single-peaked | Single-peaked | Single-peaked |
| Content of low molecular weight component (%) | 3.9% | 3.2% | 3.9% | 3.4% |
| Number average molecular weight Mn (—) | 42,100 | 41,501 | 34,052 | 39,059 |
| (the lower row indicates two significant figures) | ($4.2 \times 10^4$) | ($4.2 \times 10^4$) | ($3.4 \times 10^4$) | ($3.9 \times 10^4$) |
| Weight average molecular weight Mw (—) | 238,923 | 277,507 | 238,923 | 275,984 |
| (the lower row indicates two significant figures) | ($2.4 \times 10^5$) | ($2.8 \times 10^5$) | ($2.4 \times 10^5$) | ($2.8 \times 10^5$) |
| Boron atom content of polymer (mass ppm) | 0.64 | 0.63 | 0.68 | 0.69 |
| Thermogravimetric reduction rate (—(mass %)) | Good | Good | Good | Good |
| Impact strength with notch (—) | Excellent | Excellent | Excellent | Excellent |

TABLE 12

| | Example D29 | Example D30 | Example D31 | Example D32 | Example D33 | Example D34 | Example D35 |
|---|---|---|---|---|---|---|---|
| Initiator | Boron trifluoride dibutyl ether | | | | | | |
| Ratio of initiator to monomer [Cat]/[M] (mol/mol) | $2.6 \times 10^{-4}$ | | | | | | |
| Comonomer component | Not contained | | | | | | |
| Lewis base additive | Diethyl sulfide | Dipropyl sulfide | Methyl propyl sulfide | Dihexyl sulfide | Myristonitrile | Phenylacetonitrile | Valeronitrile |
| Ratio of Lewis base to initiator [Base]/[Cat] (mol/mol) | 16 | 12 | 16 | 7 | 3 | 7 | 8 |
| Molecular weight distribution (—) | Single-peaked | Single-peaked | Single-peaked | Single-peaked | Single-peaked | Single-peaked | Single-peaked |
| Content of low molecular weight component (%) | 4.3% | 4.6% | 3.2% | 4.9% | 4.8% | 5.1% | 4.7% |
| Number average molecular weight Mn (—) (the lower row indicates two significant figures) | 38,933 ($3.9 \times 10^4$) | 36,919 ($3.7 \times 10^4$) | 41,501 ($4.2 \times 10^4$) | 35,151 ($3.5 \times 10^4$) | 35,716 ($3.6 \times 10^4$) | 34,088 ($3.4 \times 10^4$) | 36,304 ($3.6 \times 10^4$) |
| Weight average molecular weight Mw (—) (the lower row indicates two significant figures) | 334,161 ($3.3 \times 10^5$) | 240,110 ($2.4 \times 10^5$) | 193,333 ($1.9 \times 10^5$) | 289,522 ($2.9 \times 10^5$) | 266,739 ($2.7 \times 10^5$) | 335,133 ($3.4 \times 10^5$) | 368,707 ($3.7 \times 10^5$) |
| Boron atom content of polymer (mass ppm) | 0.67 | 0.67 | 0.67 | 0.65 | 0.66 | 0.64 | 0.63 |
| Thermogravimetric reduction rate (—(mass %)) | Good | Good | Good | Good | Good | Good | Good |
| Impact strength with notch (—) | Excellent | Excellent | Excellent | Excellent | Excellent | Excellent | Excellent |

TABLE 13

| | Example D36 | Example D37 | Example D38 |
|---|---|---|---|
| Initiator | Boron trifluoride dibutyl ether | | |
| Ratio of initiator to monomer [Cat]/[M] (mol/mol) | $2.6 \times 10^{-4}$ | | |
| Comonomer component | Contained | | |
| Lewis base additive | Trifluoroacetylacetone | 3-acetylbenzotrifluoride | Tetrahydro-2-methylfuran-3-one |
| Ratio of Lewis base to initiator [Base]/[Cat] (mol/mol) | 42 | 33 | 52 |
| Molecular weight distribution (—) | Single-peaked | Single-peaked | Single-peaked |
| Content of low molecular weight component (%) | 4.3% | 2.7% | 3.9% |
| Number average molecular weight Mn (—) (the lower row indicates two significant figures) | 38,933 ($3.9 \times 10^4$) | 54,162 ($5.4 \times 10^4$) | 42,100 ($4.2 \times 10^4$) |
| Weight average molecular weight Mw (—) (the lower row indicates two significant figures) | 313,316 ($3.1 \times 10^5$) | 268,245 ($2.7 \times 10^5$) | 221,944 ($2.2 \times 10^5$) |
| Boron atom content of polymer (mass ppm) | 0.64 | 0.64 | 0.69 |
| Thermogravimetric reduction rate (—(mass %)) | Good | Good | Good |
| Impact strength with notch (—) | Excellent | Excellent | Excellent |

TABLE 14

| | Comparative Example D1 | Comparative Example D2 | Comparative Example D3 | Comparative Example D4 | Comparative Example D5 | Comparative Example D6 |
|---|---|---|---|---|---|---|
| Initiator | Boron trifluoride dibutyl ether | Boron trifluoride dibutyl ether | Phosphotungstic acid | Phosphotungstic acid | Trifluoromethanesulfonic acid | Trifluoromethanesulfonic acid |
| Ratio of initiator to monomer [Cat]/[M] (mol/mol) | $2.6 \times 10^{-4}$ | $2.6 \times 10^{-4}$ | $1.9 \times 10^{-6}$ | $2.0 \times 10^{-6}$ | $4.3 \times 10^{-6}$ | $4.5 \times 10^{-6}$ |
| Comonomer component | Contained | Not contained | Contained | Not contained | Contained | Not contained |
| Lewis base additive | Not contained | | | | | |
| Ratio of Lewis base to initiator [Base]/[Cat] (mol/mol) | — | | | | | |
| Molecular weight distribution (—) | Double-peaked | Double-peaked | Single-peaked | Single-peaked | Single-peaked | Single-peaked |
| Content of low molecular weight component (%) | 14.0% | 10.5% | 4.2% | 3.0% | 3.2% | 2.2% |
| Number average molecular weight Mn (—) (the lower row indicates two significant figures) | 22,083 ($2.2 \times 10^4$) | 26,938 ($2.7 \times 10^4$) | 51,264 ($5.1 \times 10^4$) | 59,743 ($6.0 \times 10^4$) | 57,694 ($6.0 \times 10^4$) | 60,623 ($6.0 \times 10^4$) |
| Weight average molecular weight Mw (—) (the lower row indicates two significant figures) | 174,857 ($1.7 \times 10^5$) | 197,463 ($2.0 \times 10^5$) | 169,171 ($1.7 \times 10^5$) | 197,152 ($2.0 \times 10^5$) | 190,390 ($1.9 \times 10^5$) | 200,056 ($2.0 \times 10^5$) |
| Boron atom content of polymer (mass ppm) | 0.66 | 0.67 | Not detected | Not detected | Not detected | Not detected |
| Thermogravimetric reduction rate (—(mass %)) | Excellent (10) | Good (22) | Poor (42) | Poor (64) | Poor (39) | Poor (59) |
| Impact strength with notch (—) | Poor | Poor | Excellent | Excellent | Excellent | Excellent |

INDUSTRIAL APPLICABILITY

The polyoxymethylene of the present disclosure has excellent thermal stability and impact resistance, which has industrial applicability. Additionally, the polyoxymethylene of the present disclosure has excellent mechanical strength, which has industrial applicability. Further, the method of producing polyoxymethylene of the present disclosure is a method of providing said polyoxymethylene, which has industrial applicability.

The invention claimed is:

1. Polyoxymethylene, wherein a ratio of a low molecular weight component having a molecular weight of 10,000 or less in a molecular weight distribution is 7.0% or less of the total, and the molecular weight distribution is obtained by measurement by gel permeation chromatography (GPC) using polymethyl methacrylate (PMMA) as a standard substance, and wherein the polyoxymethylene comprises 0.50 mass ppm or more and less than 100 mass ppm of boron atoms.

2. The polyoxymethylene according to claim 1, wherein a molecular weight distribution curve obtained by the measurement has a single peaked shape and has a peak having a peak top at a logarithmic value of molecular weight log M=4.5 to 7.0, where M is the molecular weight.

3. Polyoxymethylene, wherein a ratio of a low molecular weight component having a molecular weight of 10,000 or less in a molecular weight distribution is 7.0% or less of the total, and the molecular weight distribution is obtained by measurement by gel permeation chromatography (GPC) using polymethyl methacrylate (PMMA) as a standard substance, and wherein a weight average molecular weight (Mw) measured by the measurement is 750,000 or more, and the polyoxymethylene comprises 0.5 mass ppm or more of boron atoms, 5 mass ppm or more of fluorine atoms, 0.5 ppm or more of chlorine atoms, or 0.5 ppm or more of sulfur atoms.

4. The polyoxymethylene according to claim 3, wherein the molecular weight distribution obtained by the measurement has one or more peaks in a range of logarithmic value of molecular weight log M=5.0 to 7.0 where M is the molecular weight, and a ratio of a low molecular weight component having a molecular weight of 10,000 or less is 0.1% to 7.0% of the total.

5. A method of producing the polyoxymethylene according to claim 1, comprising subjecting a monomer forming a [—CH$_2$—O—] unit to cationic polymerization in the presence of an initiator, wherein the monomer is polymerized in a solid state.

6. A method of producing the polyoxymethylene according to claim 1, comprising subjecting a monomer forming a [—CH$_2$—O—] unit to cationic polymerization in the presence of an initiator, wherein the initiator is used together with mesoporous silica having an average pore size of 1.0 nm to 5.5 nm.

7. A method of producing the polyoxymethylene according to claim 1, comprising subjecting a monomer forming a [—CH$_2$—O—] unit to cationic polymerization in the presence of an initiator.

8. The method of producing polyoxymethylene according to claim 7, wherein cyclic ether is used as the monomer.

9. The method of producing polyoxymethylene according to claim 7, comprising performing polymerization at a temperature equal to or lower than a boiling point of the monomer and then performing heating at a temperature equal to or higher than a boiling point of the monomer.

10. The method of producing polyoxymethylene according to claim 7, comprising melting the monomer and cooling the melted monomer to a temperature equal to or lower than a melting point of the monomer during a polymerization reaction.

11. The method of producing polyoxymethylene according to claim 7, comprising subjecting a monomer forming a [—CH$_2$—O—] unit to cationic polymerization in the presence of an initiator and a Lewis base, wherein the Lewis base is a compound represented by the general formula (1):

general formula (1)

where each of $R_1$ and $R_2$ independently represents an alkyl group having 1 to 8 carbon atoms.

12. The method of producing polyoxymethylene according to claim 7, comprising subjecting a monomer forming a [—CH$_2$—O—] unit to cationic polymerization in the presence of an initiator and a Lewis base, wherein the Lewis base is a compound represented by the general formula (2):

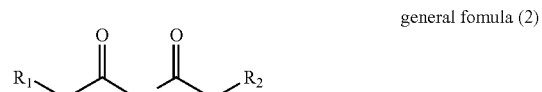

general formula (2)

where n is an integer of 1 to 8, and each of $R_1$ and $R_2$ independently represents an alkyl group having 1 to 8 carbon atoms.

13. The method of producing polyoxymethylene according to claim 7, comprising subjecting a monomer forming a [—CH$_2$—O—] unit to cationic polymerization in the presence of an initiator and a Lewis base, wherein the Lewis base is a compound represented by the general formula (3):

general formula (3)

where each of $R_1$ and $R_2$ independently represents an alkyl group having 1 to 6 carbon atoms.

14. The method of producing polyoxymethylene according to claim 7, comprising subjecting a monomer forming a [—CH$_2$—O—] unit to cationic polymerization in the presence of an initiator and a Lewis base, wherein the Lewis base is a compound represented by the general formula (4):

general formula (4)

where R represents a hydrocarbon group having 1 to 13 carbon atoms.

15. The method of producing polyoxymethylene according to claim 7, comprising subjecting a monomer forming a [—CH$_2$—O—] unit to cationic polymerization in the presence of an initiator and a Lewis base, wherein the Lewis base is a compound containing a trifluoromethyl group.

16. The method of producing polyoxymethylene according to claim 7, comprising subjecting a monomer forming a

[—CH$_2$—O—] unit to cationic polymerization in the presence of an initiator and a Lewis base, wherein the Lewis base is a cyclic compound containing a carbonyl group.

* * * * *